United States Patent [19]

McDaniel et al.

[11] 4,344,127
[45] Aug. 10, 1982

[54] MICROPROCESSOR BASED PROCESS CONTROL SYSTEM

[75] Inventors: George H. McDaniel, Northville; Thomas W. Hartford, Livonia; William R. Hungerford, Detroit; William J. Perzanowski, Troy; Reno V. Benaglio, Bloomfield Hills, all of Mich.

[73] Assignee: The Bendix Corporation, Southfield, Mich.

[21] Appl. No.: 182,201

[22] Filed: Aug. 28, 1980

[51] Int. Cl.³ .......................................... G05B 19/403
[52] U.S. Cl. ................................... 364/130; 364/171; 364/474; 364/900; 318/569
[58] Field of Search ... 364/474, 475, 107, 200 MS File, 364/900 MS File, 120, 130, 167-171, 188-190; 318/569, 570, 571

[56] References Cited

U.S. PATENT DOCUMENTS

| | | | |
|---|---|---|---|
| 4,199,814 | 4/1980 | Rapp et al. | 364/474 |
| 4,209,847 | 6/1980 | Noda et al. | 364/474 X |
| 4,293,913 | 10/1981 | Nishimura et al. | 364/107 X |

Primary Examiner—Joseph F. Ruggiero
Attorney, Agent, or Firm—Markell Seitzman; Russel C. Wells

[57] ABSTRACT

A microprocessor numerical control system having a prom module which contains the operating program of the system and a processor module which contains a microprocessor generating multiplexed data and address information on an internal bus. The processor module further includes bus control logic and address and data transceivers which interface the internal bus with the system's address data and control buses. The processor module further includes a variety of timing and interrupt control circuits which permits selective communication with other modules in the system. The system further includes a peripherial interface module having thereon logic to communicate with a CRT, keyboard, audible and visual indicators and an A to D converter which may be used to input feedrate override information into the processor memory. The peripherial interface module further provides interface circuitry between the processor module and a CRT display and has the capability of displaying on the display, in response to operator commands, input via the keyboard, a character display having a height which is twice that which is displayed in the normal mode of operation. The system further includes a servo output module for generating commands to drive associated motors on each of the axes of the machine tool and a transducer module which provides feedback information from these machine axes. In addition, the system further includes an input signal and an output signal module that are used to indicate and/or command the various states or modes of operation of the machine.

11 Claims, 32 Drawing Figures

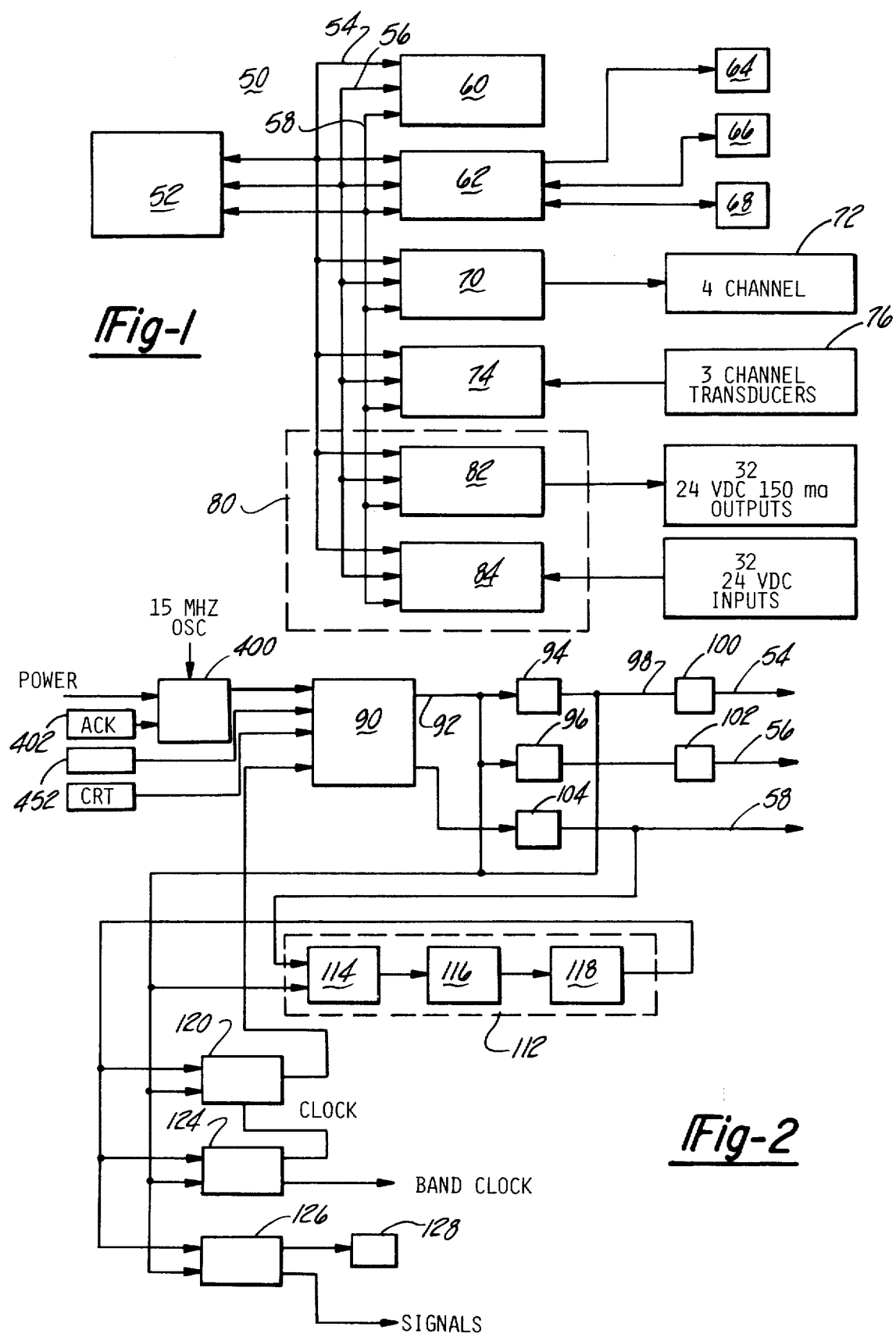

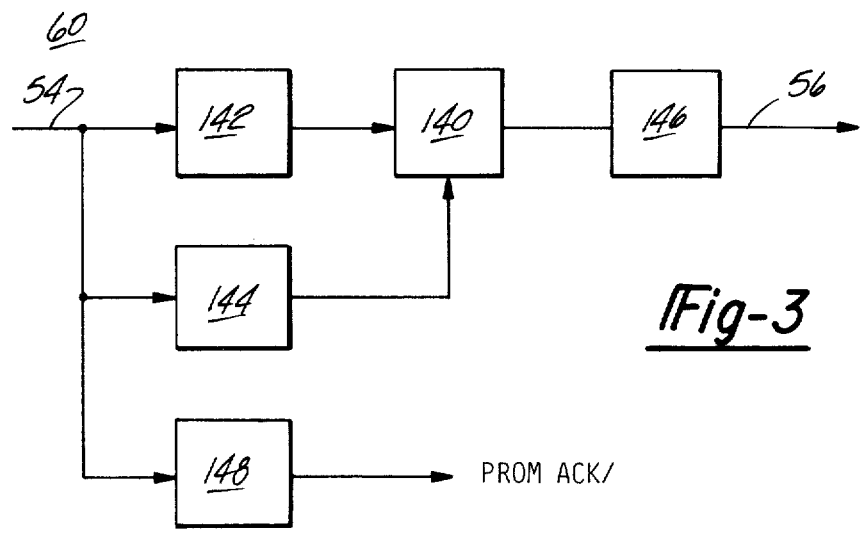
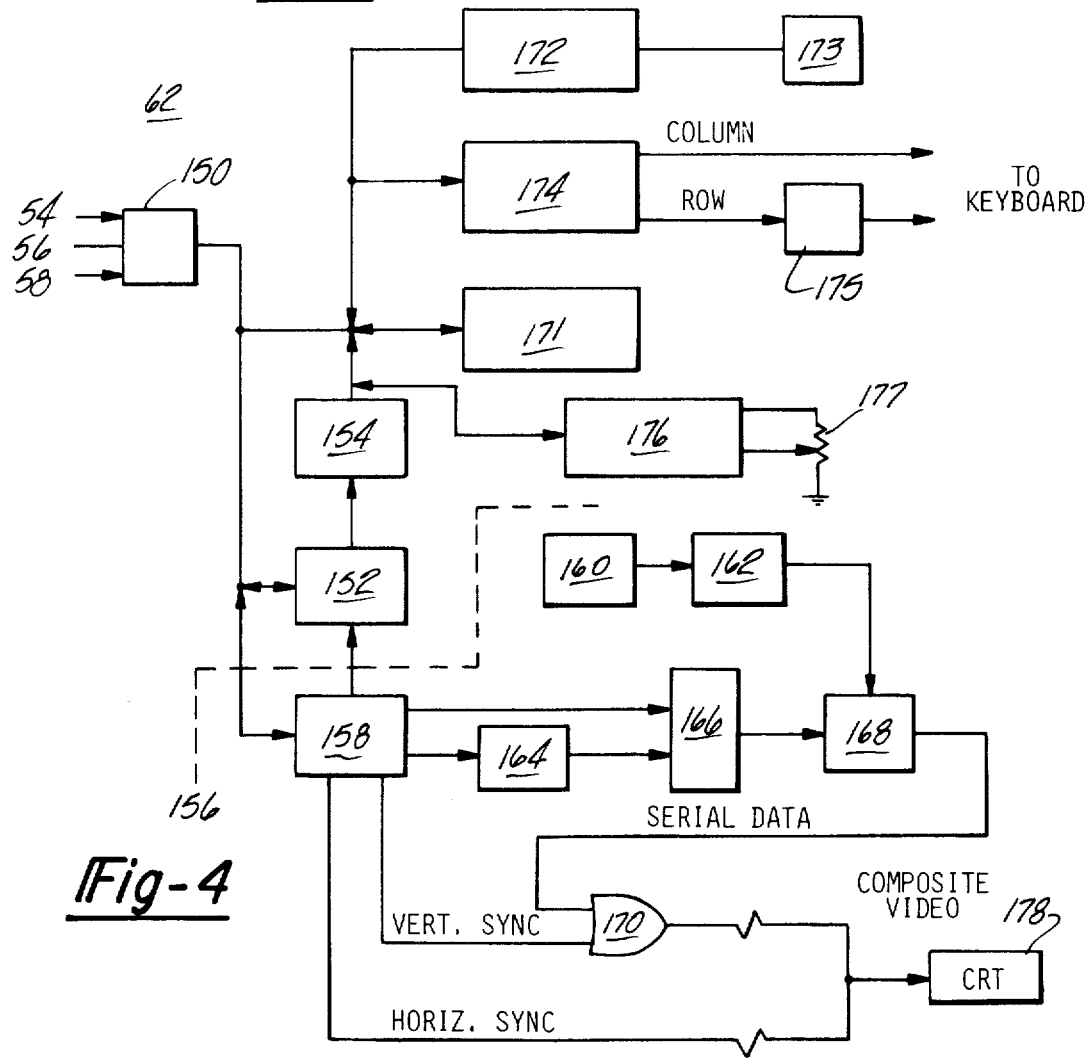

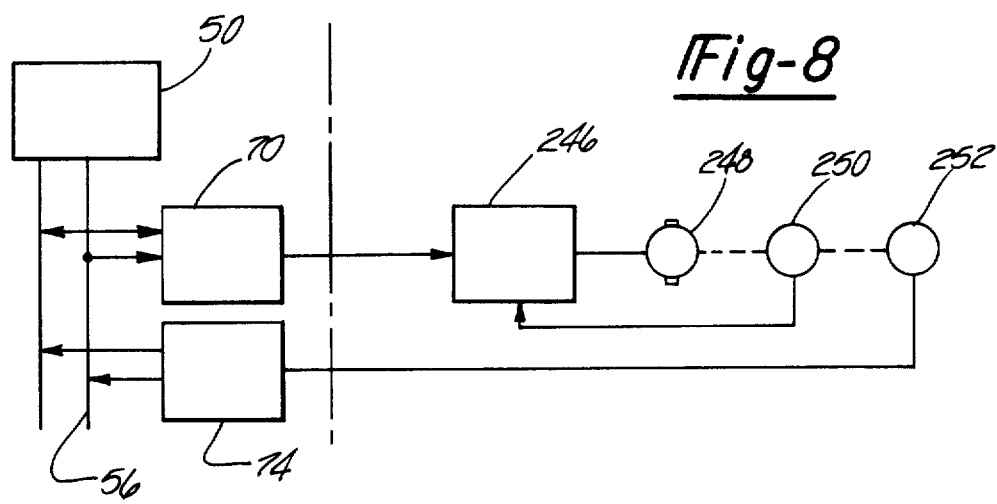
_Fig-8_
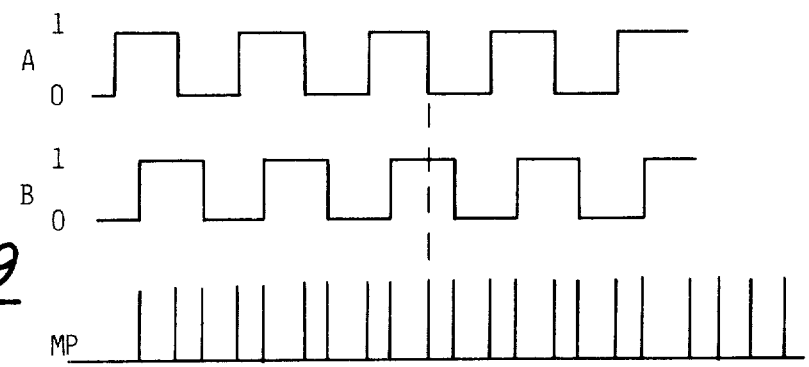
_Fig-9_
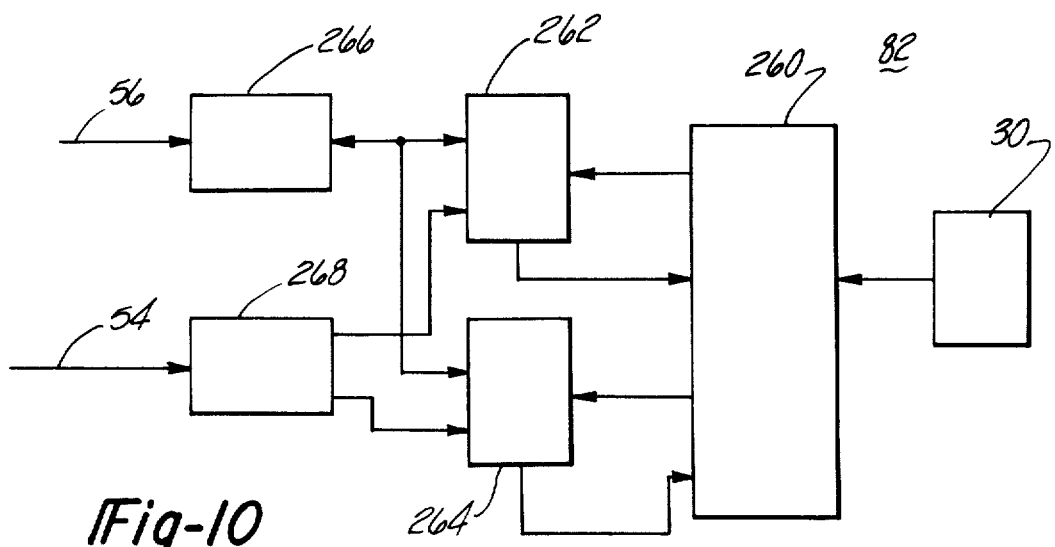
_Fig-10_

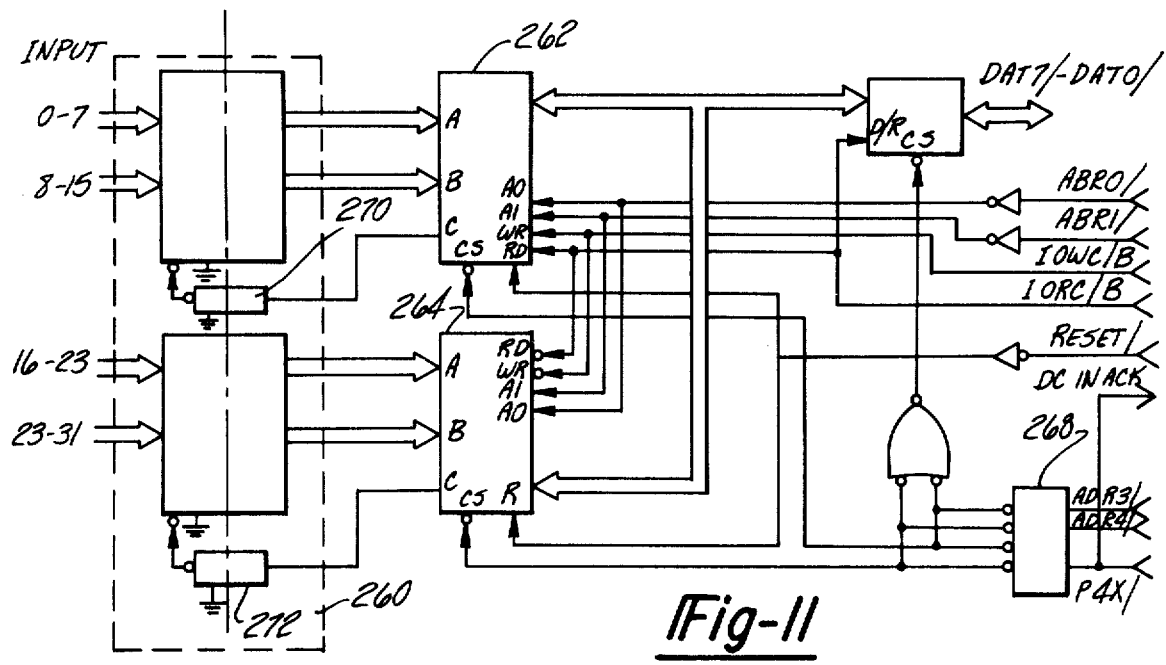
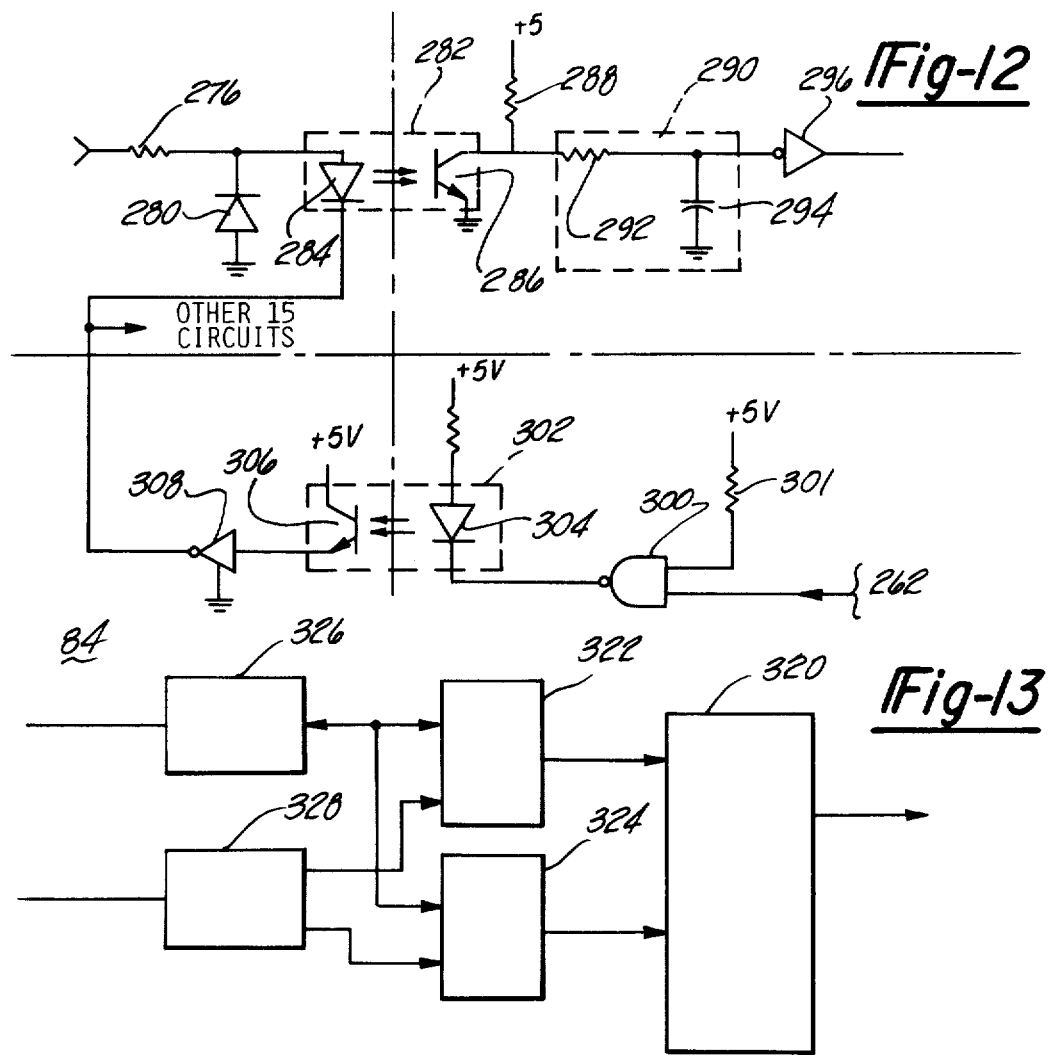

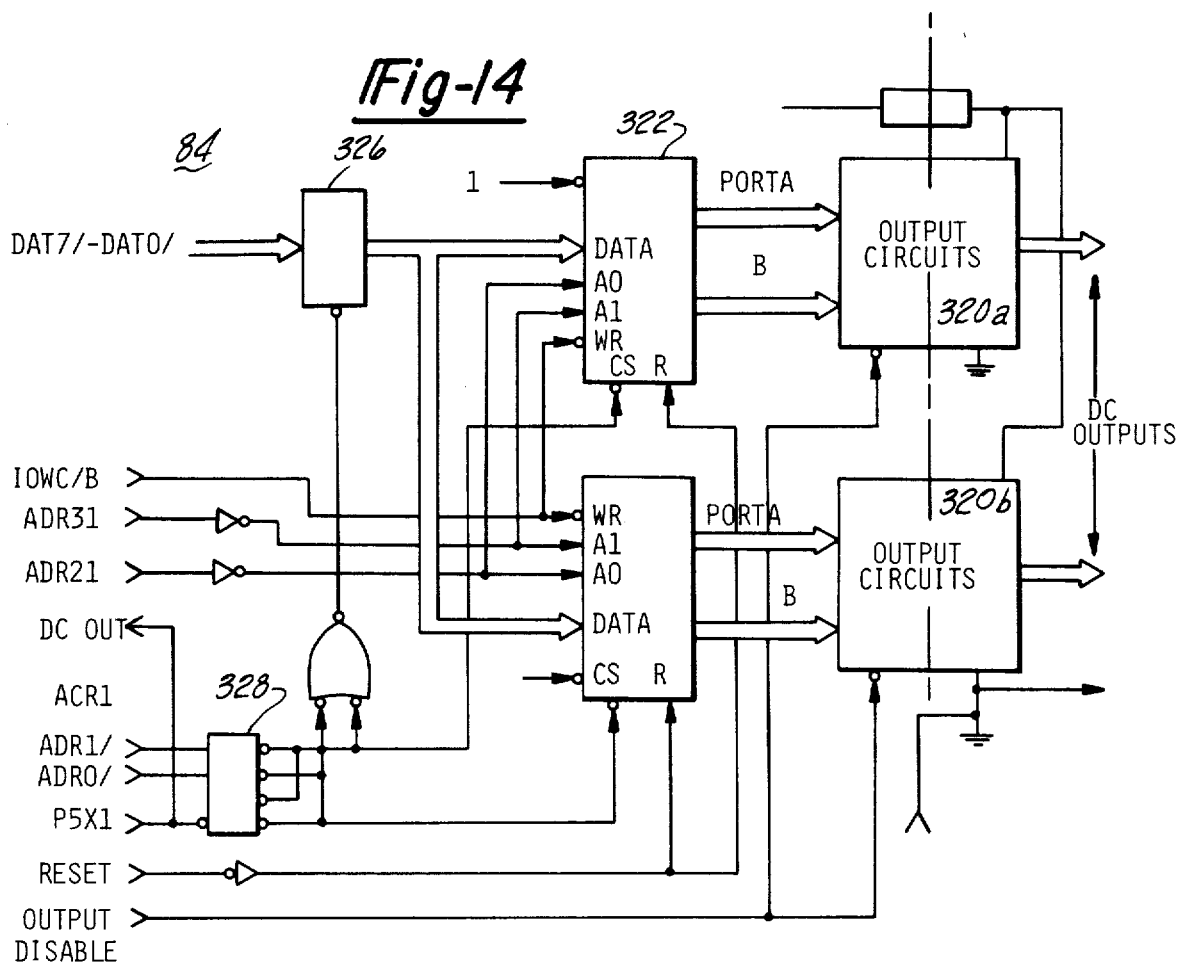
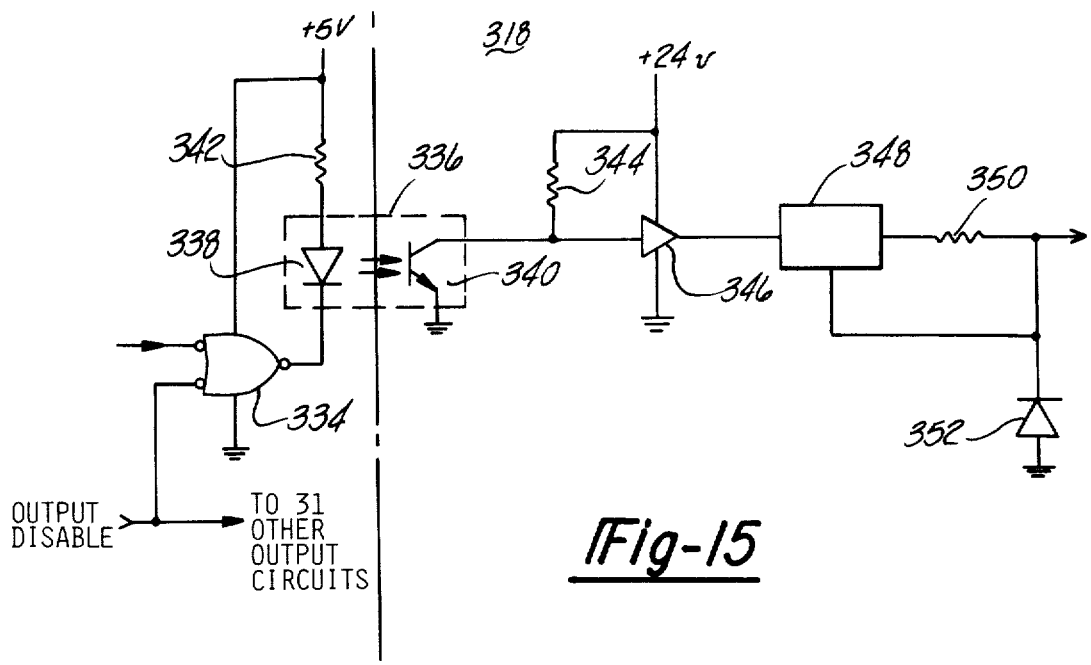

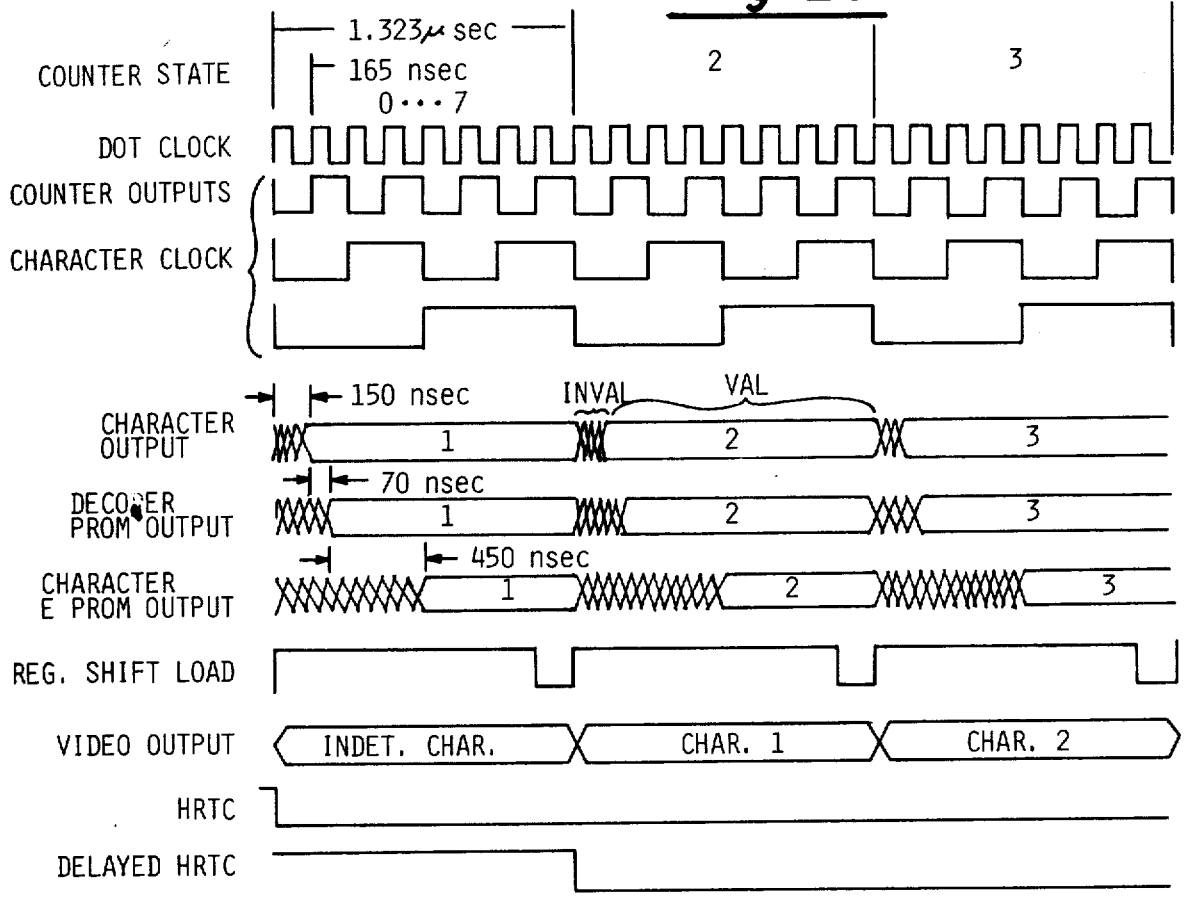

Fig-29B

```
JOG MODE

0 - SLOW                    POSITION:
1 - MEDIUM                  X+016.1357
2 - FAST                    Y-003.6500
3 - RAPID                   Z+000.0000
4 - 0.0001  INCH
5 - 0.0010  INCH            DISTANCE MOVED:
6 - 0.0100  INCH            X+000.0000
7 - 0.1000  INCH            Y+000.0000
8 - 1.0000  INCH            Z+000.0000
9 - ZERO SET
H - HOME
M - MACHINE ZERO
```

Fig-29C

```
POSITION:        IP   DISTANCE MOVED:
X+016.1357       X    X000.0000
Y-003.6500       X    Y000.0000
Z+000.0000            Z000.0000
```

MICROPROCESSOR BASED PROCESS CONTROL SYSTEM

BACKGROUND AND SUMMARY OF THE INVENTION

This invention relates to a microprocessor process control system for controlling and monitoring industrial equipment and more particularly to a microprocessor control system for machine tools, machining centers and other industrial processes.

Many industrial processes and particularly machine processes performed by numerically controlled machine tools require by their very nature highly complex and non-repetitive instructions to command a tool to machine the complex outlines of a workpiece. However, many of the processes or tooling operations require repetitive yet simple instructions to generate the required series of process or machine tool movements.

Prior controllers have required a programmer, having numerical control, machining and programming skills to generate a tape defining the unique instructions, i.e. part program, containing the required tool displacements and machine tool commands to transform the workpiece into a finished product. These part programs are often generated using larger general purpose computers and the like.

In contrast the present invention has taken advantage of the recent widespread commercialization and availability of sophisticated microprocessors. More specifically, the resulting system is applicable to the class of numerically controlled processor called manual data input controllers, as well as industrial processors generally. The present invention yields a relatively inexpensive and smaller unit, thereby permitting the system to be pendently mounted to the machine tool. In addition, the present invention eliminates, for many purposes, the need for a skilled programmer.

This is accomplished by including within the system a number of pre-programmed, normalized part programs containing instructions to command the machine. A particular program is selected by the operator via communications through the keyboard or some other similar device. In response to this selection, the system enters a conversational mode thereby informing the operator of the data required to execute the selected stored program. As can be seen from the above, the operator need not be conversant in computer programming or skilled in the operation of numerically controlled machines. The operator need only follow the requests received from the system. In addition, the need for generating computer aided part programs, as utilized in prior numerically controlled systems is considerably alleviated. The operator can, with minimal skills, link various pre-programmed part programs to generate non-repetitive sequence of events or may directly create an additional part program by manually inputting a sequence of instructions in the system.

It therefore is an object of the present invention to provide a microprocessor based process control system.

It is another object of the present invention to provide a process control system having a central processor that generates a 16 bit word and is capable of interfacing with 8 and/or 16 bit peripheral information transfer modules including keyboards, tape recorders and cathode ray tubes.

It is object of the present invention to provide a display circuit for the process control system to display to the operator the current status of prespecified functions of the machine or process being controlled or performed, thus permitting the operator to concentrate his efforts on monitoring the machine while concurrently receiving the displayed information.

In conjunction with the last mentioned object, it is a further object of the present invention to aid the operators tasks by optionally displaying to the operator certain parameters in an enlarged format.

It is another object of the present invention to provide an interactive microprocessor based control system for a machine tool.

In conjunction with the last named object, it is a feature of the present invention to free the operator from the requirement of generating complex and lengthy part programs which control the machine tool, by including within the present system a variety of resident, normalized, part programs of frequently used machine tool functions, requiring only input data which is displayed by the system to the operator and which is then manually input to the system in response thereto.

These and other objects, purposes, features and advantages are accomplished in accordance with the teachings below.

BRIEF DESCRIPTION OF THE DRAWINGS

In the drawings:

FIG. 1 is a block diagram of a microprocessor control system.

FIG. 2 is a block diagram of the processor module of the system.

FIG. 3 is a block diagram illustrating the program storage module of the system.

FIG. 4 is a block diagram illustrating the peripheral control module of the system.

FIG. 8 is a block diagram illustrating a closed control loop circuit.

FIG. 9 graphically illustrates the wave forms generated by a typical transducer incorporated within the control loop of FIG. 8.

FIG. 10 is a block diagram of the input signal module.

FIG. 11 is a more detailed schematic diagram of the input signal module of FIG. 10.

FIG. 12 illustrates one of the input circuits contained within the input signal module of FIG. 11.

FIG. 13 is a block diagram of the output signal module.

FIG. 14 illustrates a more detailed schematic diagram of the output signal module.

FIG. 15 illustrates a circuit diagram of one of the output driver circuits contained within the output signal module.

FIG. 25 graphically illustrates CRT timing waveforms.

FIG. 26 graphically illustrates horizontal synchronization timing waveforms.

FIG. 27 graphically illustrates vertical synchronization timing signals.

FIG. 28 graphically illustrates the composite video timing waveforms.

DETAILED DESCRIPTION OF THE DRAWINGS

Figure 5:
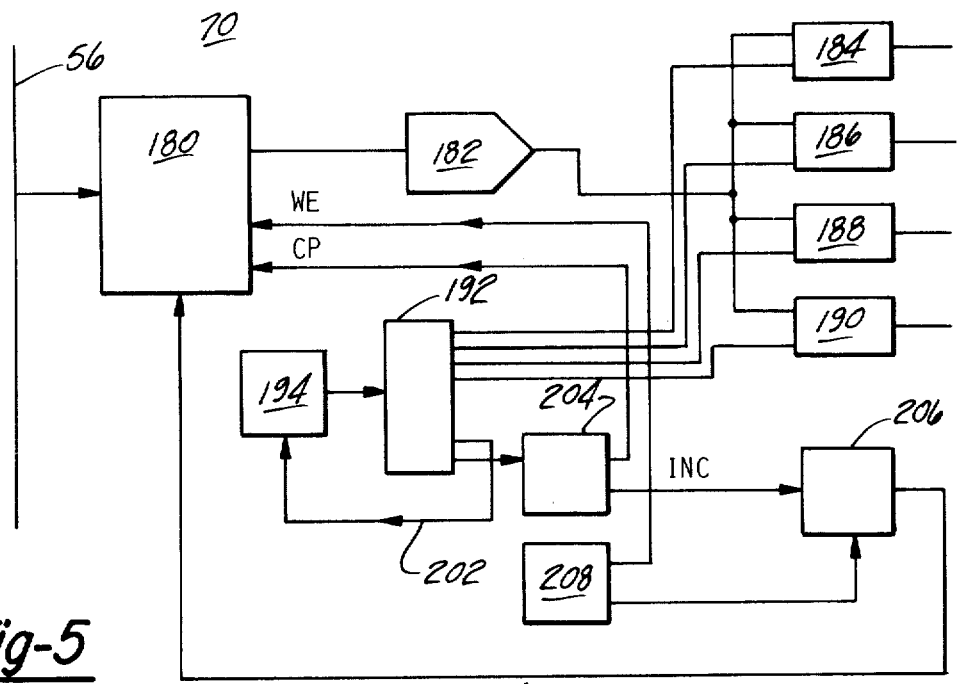
FIG. 5 is a block diagram of the servo output module.

Reference is made to FIG. 1 which illustrates a microprocessor control system 50 configured to control the operation of an associate machine. The system includes a central processor 52 that communicates via bi-directional data, address and control busses 54, 56 and 58 to a plurality of separated modules. In particular, the system 50 includes a PROM module 60 for storing the executive program of the system 50, a peripheral control module 62 that is designed to interface and control a plurality of information transmitting devices such as a cathode ray tube (CRT) 64, a keyboard 66 and a teletype 68. A servo output module 70 interfaces the central processor 52 with a plurality of channels. In this application the channels represent four machine drives 72. The system 50 further includes a transducer interface module 74 for receiving input signals from a plurality of transducers 76 each of which is attached to movable elements of the machine (not shown) being controlled. The system 50 further includes a signal module 80 which includes a input signal module 82 and output signal module 84.

Reference is now made to FIG. 2 which illustrates a block diagram of the central processor 52. The central processor 52 includes microprocessor 90 and be of the type such as the Intel 8086 having an arithmetic logic unit and working registers. Address and data are multiplexed via an internal bus 92 to the address latch 94. The address latch 94 is connected via bus line 98 to an address bus driver or transceiver 100 that places address information on the system address bus 54 for communication between the central processor 52 and other modules in the system 50. A byte swap logic 96 communicates with a data bus transceiver 102 that is used to transfer data between the central processor 52 and other modules in the system via the system data bus 56. The byte swap logic allows a byte from either the low byte of memory (AD0-AD7), or the high byte of memory (AD8-ADF) to be transmitted on the low byte of the data bus 56 (DAT0/-DAT7/). This feature allows an 8-bit device such as DMA controller 152 or the CRT controller (158) of FIG. 4 to be interfaced with the 16-bit processor 90. The processor 90 further communicates to a bus control 104 which is a bipolar component that provides command and control timing generation and bipolar bus driving capability. The bus control 104 decodes status signals from the processor 90 in order to detect the type of system operation that is in progress. These operations may include I/O read, I/O write, memory read, memory write. The bus control 104 also generates an address latch enable (ALE) signal. Recalling that the output signals from the processor 90 are multiplexed address and data information, the ALE signal identifies the times that address information is present and causes this information to be latched into the address latch 94. The address latch 94 is utilized in system 50 to accomodate the multiplexed output of processor 90. The output of the transceivers 100, 102 and the bus control 104 corresponds to the address bus 54, data bus 56 and control bus 58, respectively. The processor 90, address latch 94 and bus control 104 communicate with a random access memory (RAM) 112 that comprises a dynamic RAM controller 114 that is used to address a RAM 116 to control and load the data latch 118. The RAM 116 contains part program and other data which is received from the PROM module 62, keyboard 64 etc. Information from data latch 118 is transmitted via an internal data bus 119 to programmable interrupt control 120 which also receives address information via bus or line 92. As will be discussed later, the programmable interrupt controller 120 provides the priority control for a number of interrupt signals required by processor 90 and the various other system modules. The system 50 further includes a programmable interval timer 124 which may include a plurality of programmable down counters and a mode control register. This timer 124 provides, inter alia, a real time clocking signal to the programmable interrupt control 120 and further generates a baud clock for various system serial interfaces. The system 50 further includes a programmable peripheral interface 126. Data is transferred to and from the programmable peripheral interface 126 via the internal data and address busses 92 and 120. The output of the interface 126 provides additional systems ports to control or monitor a plurality of switches or LED's associated with various components associated with test points within the system. In addition, the interface 126 is connected to a watchdog timer 128, the purpose is to detect whether or not the servo output module 70 signals are being updated and whether or not the control system 50 operating in an open loop manner and thereby generate an emergency stopping signal to inform the processor 90 and the operator of improper conditions.

In addition to the watchdog timer 128 the interrupt signals required by processor 90 include a real time clock interrupt which is a relatively short period signal, such as 12 milliseconds, which causes the processor 90 to control and update the servo output module 70 and to perform a number of housekeeping functions which must be performed within a short time frame. Another interrupt signal required by the processor 90 is a CRT interrupt communicated from the CRT controller 154 which informs the processor 90 that the CRT 66 has completed a page of data and that it is available to display additional information. Another interrupt signal required by processor 90 is a fail-safe time interrupt. Each time the processor 90 performs an I/O memory or interrupt operation an interrupt signal or an acknowledge signal must be generated internally or by the appropriate system module (60, 62, 70, 74, 80) and communicated via the acknowledge logic 402 which sends a READY signal to the processor 90. The acknowledge logic 402 is shown in greater detail in FIG. 10. The failsafe timer 452 which is also shown in detail in FIG. 16 comprises a monostable multivibrator having an extremely short time period, such as 4 milliseconds. This timer (452) is normally continually retriggered by the ALE signal from the bus controller 104. If however, processor 90 does not receive the required READY signal within a prespecified time frame the fail-safe timer 452 causes processor 90 to resume operation and indicate that an error has occurred.

Figure 16:
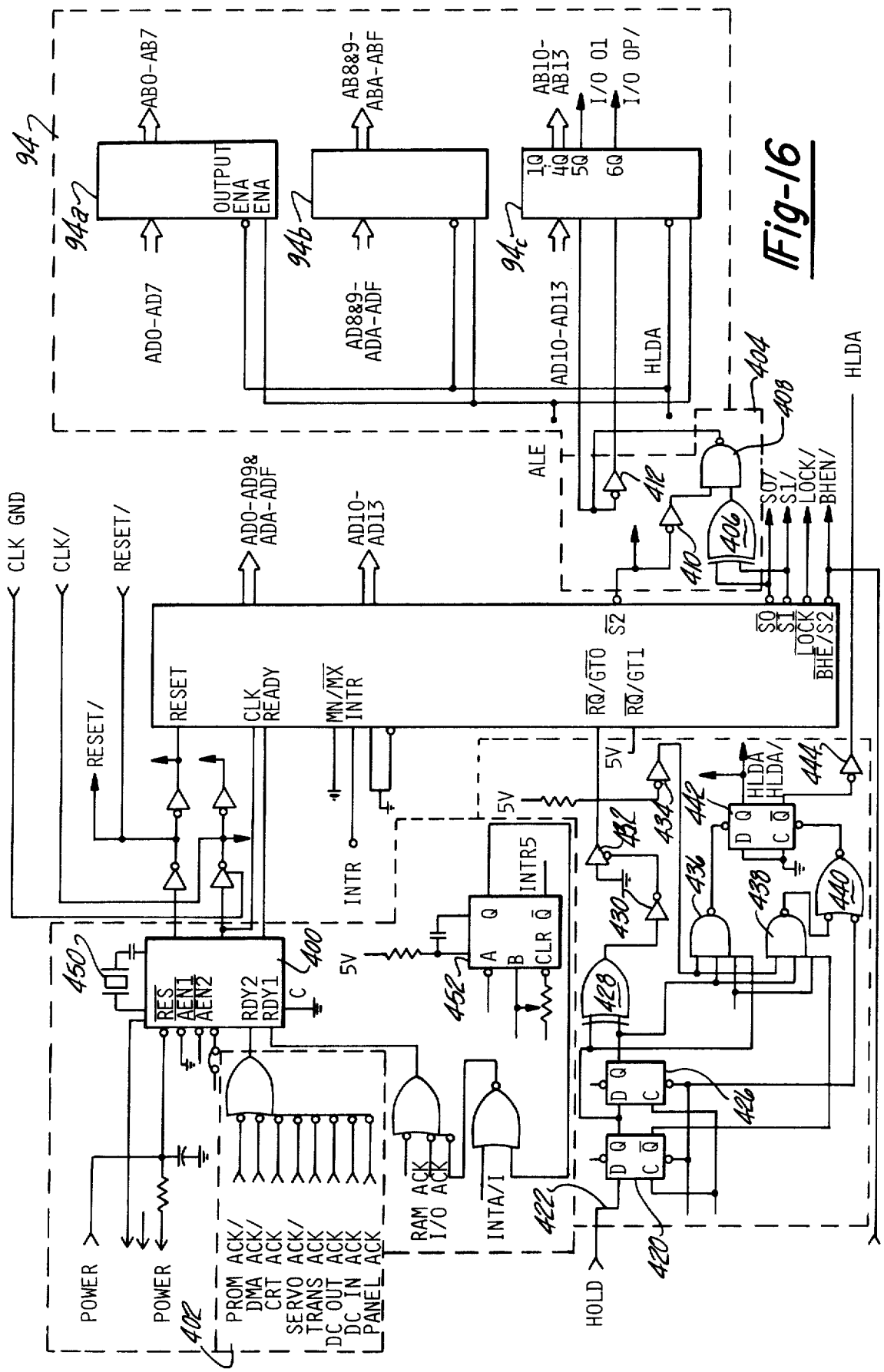
FIG. 16 illustrates a more detailed diagram of a portion of the processor module of FIG. 2.

The processor module 52 further includes request/-grant logic 420, which is discussed in greater detail in regards to FIG. 16. The logic 420 provides a means for transferring control of the bus 54 and 56 from the processor 90 to some other device such as the DMA controller 152 of FIG. 4 wherein such device now communicates directly with the data bus 56 and RAM 112.

Reference is briefly made to FIG. 3 which illustrates a block diagram of the PROM module 60 of FIG. 1. The PROM module 60 communicates via the address, data and control busses 54, 56 and 58. The PROM module 60 contains a programmable read memory (PROM or EPROM) 140. The PROM 140 is programmed with the operating program of the control system 50 in a known manner to execute a set of determinable functions and serves to initialize the system's parameters. The address information is input to the PROM 140 via the address bus 54 through a tristate inverting buffer 142. An address decoder 144 controls the access of the address information by the PROM 140. The output signals from PROM 140 are placed onto the data bus 56 after being buffered by the tristate buffer 146. The PROM module 60 further includes acknowledge logic 148 which generates an ackowledge signal which is sent to the processor 90 to acknowledge to the processor 90 that good data is present on the data bus 56. The PROM module 60 contains the systems operating instructions and tables of fixed data. The result of these operations performed by the PROM module 60 are transferred to the memory within processor 90 and to RAM 112.

Figure 24:
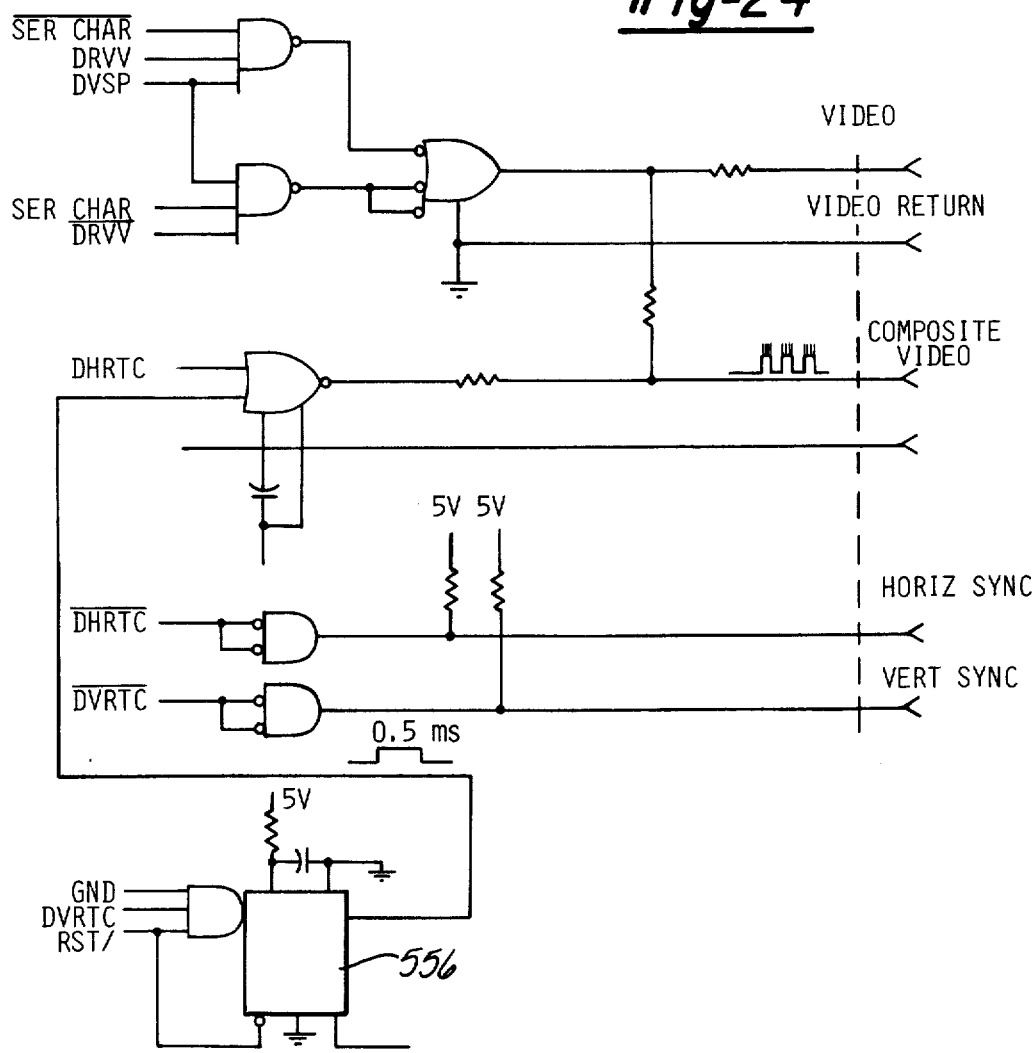
FIG. 24 illustrates a video output driver.
Figure 23:
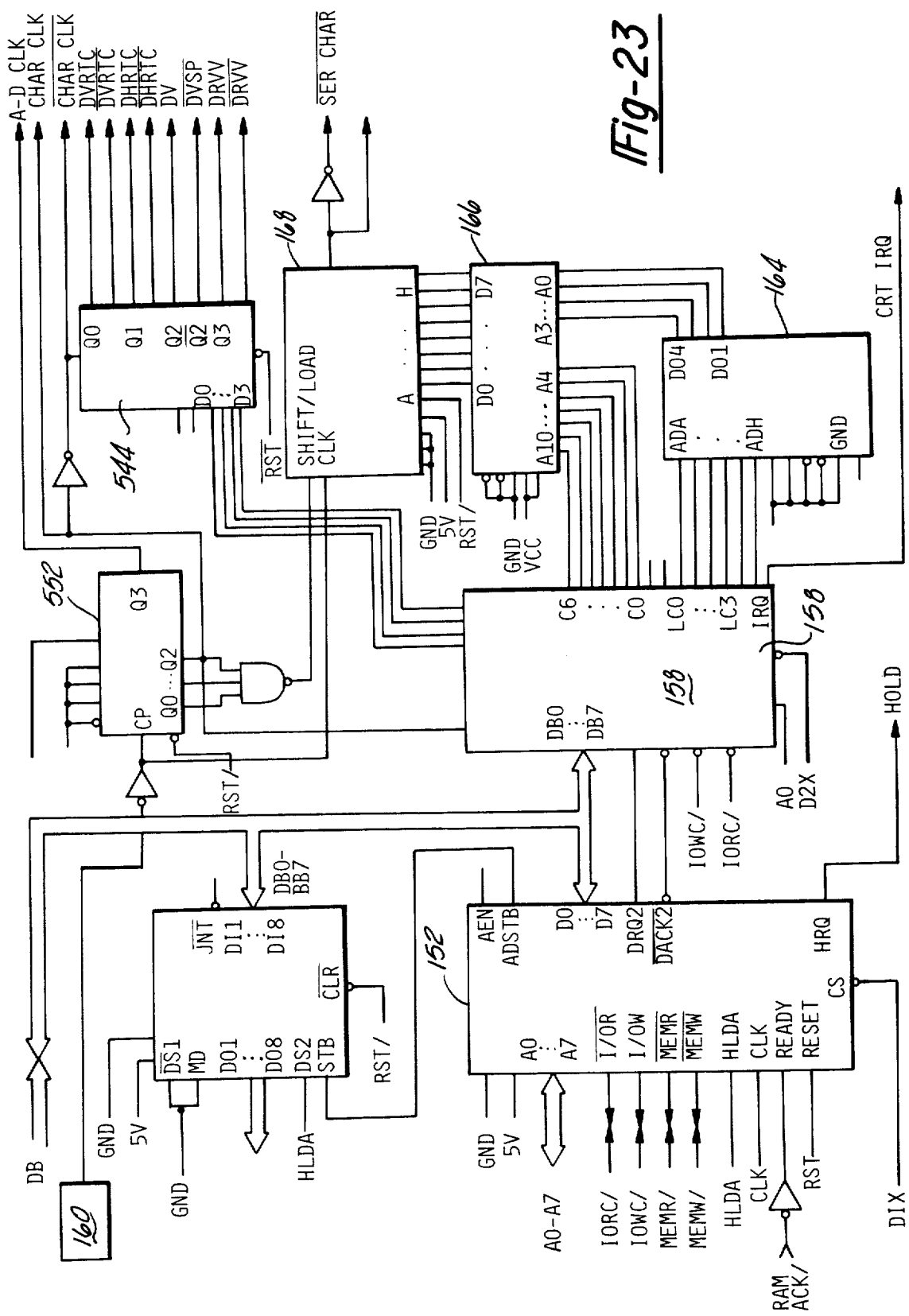
FIG. 23 illustrates a more detailed circuit diagram of a portion of the peripheral module of FIG. 4.

Reference is made to FIG. 4 which illustrates a block diagram of the peripheral control module 62. The peripheral control module 62 communicates with the systems address control and data buses via the buffer or bus transceiver 150. Thus creating internal buffered address control and data buses within module 62. The peripheral control module 62 is shown in greater detail in FIGS. 23 through 27. The bus transceiver 150 communicates with the four major sections of the peripheral control module. These are the CRT control logic 156, the scanner logic 172, 173, the indicator logic 171 which is utilized to activate a bell or a beeper, a motion stop and cycle start indicator lights on the panel of the control unit and the keyboard logic comprising a keyboard controller 174 and an associated decoder 175. The buffer 150 further interfaces with a feedrate override control analog to digital converter 176. More particularly, the buffer or transceiver 150 communicates to a direct access controller (DMA) 152. In the embodiment illustrated the DMA controller 152 has only eight pins assigned for address information. Consequently, in order to provide the full 16 bits of address information to the processor 90, a DMA address latch 154 is incorporated within the system. The CRT controller logic 156 communicates with the DMA controller 152 and buffer 150. The CRT controller logic generates signals to be used by the cathode rate tube (CRT) 178. The DMA controller 152 controls the flow of data from the processor (computer memory) to the CRT control 158. The CRT controller 158 in turn requests and receives data from the DMA controller 152 and provides the necessary timing and control to right dot matrix characters on the face of the CRT 178. The CRT controller communicates with a bi-polar PROM which provides double height characters on the face of the CRT 178. A character PROM 166 provides storage of the predetermined set of dot matrix characters to be generated on the CRT 178. Each character line of the character PROM 166 is transferred to a shift register such as an 8-bit parallel input serial output register 168 which, in turn, shifts the information to the video input of the CRT 178. A clock oscillator provides a dot clock signal to the shift register. In the embodiment shown in FIGS. 4 and 23, a 6.048 MHz signal is utilized. The dot clock signal is divided down to provide a 756 KHz clocking frequency to provide a character clock 162 for use by the CRT controller logic 156. FIG. 23 illustrates a circuit for combining various signals of the CRT controller logic 156 into a video output driver 550 which generates the horizontal and vertical sync signals. As previously mentioned, the horizontal and vertical sync signals are combined into a single composite video signal prior to transmission to the CRT 178. In essence, the composite signal means that data and sync signals are on the same line that goes to the CRT 178 and the monitor within the CRT 178 thereafter separates the signals to separate sync and data signals. The vertical sync output of the video driver 550 is combined with the serial data from the shift register 168 which is later combined with the horizontal sync signal as illustrated in FIG. 24. In operation the CRT logic 156 is as follows. When initialized by an operating system command from the PROM 60 or processor 90 the CRT controller 158 requests DMA service from the DMA controller 152. As previously mentioned the DMA controller 152 activates a HOLD signal to the processor 90 which upon completing its current instruction switches the bus outputs to a high impedence condition thereby releasing the system buses to the DMA controller 152. The DMA controller 152 then provides addresses to the system's address bus 54 to access the system memory assigned for CRT 178 messages to be displayed. The DMA controller generates a memory read signal which causes the address memory word to place its contents on the data bus 56. The DMA controller 152 then generates a I/O wright signal which causes the data bus 56 to be clocked into the CRT controller 158. The CRT controller 158 takes the character information provided to it from the DMA controller 152 and the data bus 56 and generates the necessary line signal commands and character codes to the decoder PROM 164 and character PROM 166 to effect the generation of the pre-specified series of dot characters on the face of the CRT 178. The CRT controller 158 may be of the type such as the Intel 8275 which contains a data bus buffer, read-write, DMA control logic, a character counter, display row counters, buffer input controller, buffer output controller, two eighty character FIFO buffers, a character FIFO line counter and raster timing and video control circuits.

Figure 6:
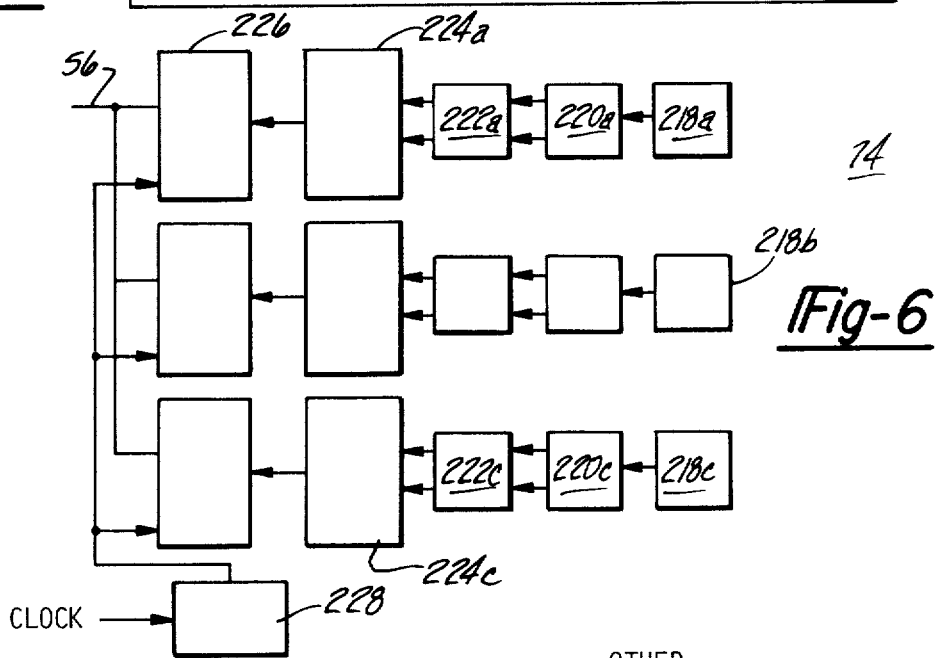
FIG. 6 is a block diagram of the transducer interface module.
Figure 7:
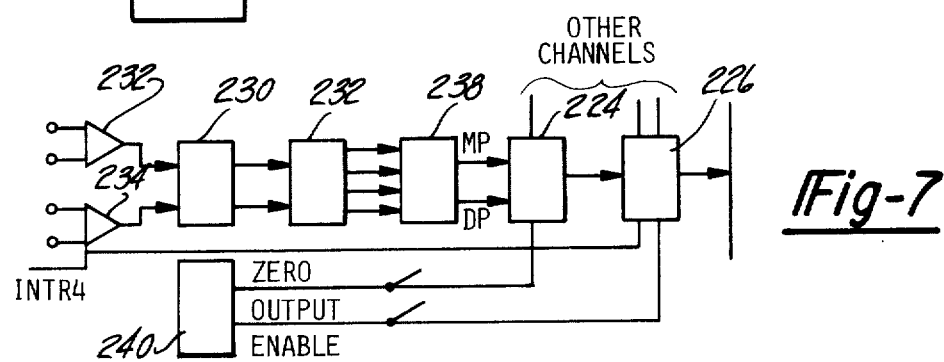
FIG. 7 is a more detailed block diagram of the transducer interface module.

Reference is now made to FIGS. 5, 6 and 7 which respectively illustrated a block diagram of the servo output module 70, a block diagram of the transducer interface module 74 and the block diagram illustrating a closed loop servo system incorporating the processor module 50, the servo output module 70 and transducer module 74.

The servo output module 70 of FIG. 5 converts a velocity command sent by the processor 90 via the data bus 56 from a digital number to a voltage which commands the machine to move. The servo output module 70 produces a voltage for each axis that is proportional its input or velocity command number. This voltage is transmitted to each drive unit as illustrated in FIG. 7. More specifically, the servo output module 70 comprises the output data memory 180 such as a 4×16 bit random access memory that is connected to a single digital to analog converter 182. The digital to analog converter 182 is shared between each sample and hold circuits 184, 186, 188 and 190. The sample and hold circuits (184-190) are directed by a clocking signal received from PROM 192 to transmit the voltage received from the digital to analog converter 182 to the machine. The PROM 192 is activated by the conversion control counter 194 which causes the PROM 192 to count through its addressing sequence and to output the clocking signals to the sample and hold circuits. The PROM 192 further generates a reset signal on line 202 which is used to reset counter 194 upon the completion of the generating of each of the four clocking signals. An additional clock signal is transmitted to the read control 204. The read control circuit 204 controls the flow of data from the output data memory 180 to the digital to analog converter 182. The read control circuit 204 is activated by a pulsed signal received from the PROM 192 and generates an output signal (INC) which increments the address counter 206. The address counter 206 is periodically incremented, at a rate such as 100 microseconds, to address data for the next axis. In addition, the read control circuit 204 generates a clocking pulse (CP) for use by memory 180. The servo output module 70 further includes a write control circuit 208 which allows data to be written into the output data memory 180. The write control circuit 208 controls the memory address and generates a write enable (WE) pulse to write data into the output memory 180 whenever data is sent out by the processor 90. In the present embodiment, during intervals that the write enable function is activated, the read function is inhibited.

In operation the servo output module receives a digital number over the data bus 56. In the embodiment illustrated, a 16 bit number is used. The 16 bit digital to analog converter 182, is shared between each of the plurality of output axes, and converts these digital numbers to corresponding analog voltages. The processor 90 sends each of these digital numbers which correspond to velocity command numbers for each axis to the servo output module 70 where it is stored in each memory location reserved therein for each respective axis. This data is then supplied one word at a time to the digital to analog converter 182. The analog voltage output is stored, for each axis, in a corresponding sample and hold circuit 184-190. Upon selected activation by the conversion control counter 194 the analog voltages are updated and transmitted to the respective servo drives (see FIG. 7). Data is received and taken from the memory 180 by the write and read control circuits 208 and 204, respectively. The write function allows data to be written into the memory 180 while the read function allows data to be taken out of the memory 180, converted by the digital to analog converter 182 and stored by a sample and hold circuit. As previously mentioned, the write function selects a memory address in a known manner from the address counter. The processor 90 is programmed to use a separate device address for each axis. Output instructions select a corresponding address as in the memory 180 according to a predetermined schedule. In response to the write enable (WE) pulse, data appearing on the bus 56 is written into the locations defined by the address counter 206. To output the data in memory 180 requires the read control circuit 204 to be periodically activated. In the present embodiment, the address counter 206 is incremented by the read control circuit 204 every 100 microseconds; then 75 microseconds thereafter the conversion counter 194 increments the PROM 192 to generate clocking pulses to each of the respective sample and hold circuits. The delay of 75 microseconds allows time for the digital to analog converter 182 to transform the digital number to an analog voltage. As can be seen after 4 increment periods, i.e. 400 microseconds, the data for all four axes has been converted and the above cycle repeats itself in response to the reset signal generated by the PROM 192 and sent to the conversion control counter 194.

Reference is now made to FIG. 6 which illustrates a block diagram of the transducer interface module 74. The transducer interface module 74 is shown communicating with three input channels, although the number of channels is arbitrary. The signal path for each channel is essentially a cascade of individual networks. More specifically, the output of each transducers 218a-c is received by a signal conditioning network 220a-c, the output of which is used to activate a count control circuit 222 which, in turn, increments an up/down counter 224. The output of the counters 224 is stored in the data latch 226. The data in each of the data latches 226a-c is selectively placed on the data bus 56 by the latch control circuit 228.

Reference is briefly made to FIG. 7 which illustrates a more detailed blocked diagram of one of the transducer signal paths. More particularly, the signals from the encoder or transducer 218 are transmitted to optical isolators 230 by the line receivers 232 and 234. The line receivers (232, 234) enhance noise immunity while the optical isolators 230 isolate the signal train from the noisy machine environment. The output of the optical isolator 230 sets flip flop 236. The flip flop 236 synchronizes the transducer or encoder signals with the system clock. These encoder signals are decoded in a PROM 238 to produce motion pulses (MP) and direction pulses (DP). The motion pulses are accumulated according to the sign they have in the 16 bit up/down counter 240 according to the detected direction of motion. The 16 bit digital output of the counters 224 are transmitted to the data latch 226 by clocking signals received from the address coding circuit 240. Data is transmitted to the data bus 56 in response to an interrupt (INTR4) signal generated by the program interrupt control 120 and processor 90. System 50 may be used as either as a point to point or as a contouring NC systems. In order to perform contouring accurately the simultaneous relative positions of each axis must be known precisely. This is accomplished by transferring, relatively simultaneously, the outputs of transducers 218 to their respective data latches 226. Even though processor 90 may obtain this information in a serial manner from the data latches 226 they represent machine motion at a given point in time.

Reference is now made to FIGS. 8 and 9 which illustrate respectively a single closed loop control axis and the feedback signals obtained from a typical transducer 218 that would be attached to one of the axes of a machine tool. This transducer 218 may be of the type such as an incremental pulse encoder 252. There is shown a processor 52 communicating to the servo output module 70 and receiving information from the transducer input module 74 via the systems busses 54, 56 and 58. The output signals generated by the sample and hold circuits 184-190 are output to respective dc drive units 246 which buffer, amplify and provide compensation for the respective input signal prior to transmitting the signal to a motor such as the dc motor 248. Motor 248 is, in turn, coupled to a slide or movable part of the machine tool (not shown) having attached thereto speed and position transducer such as the tachometer 250 and incremental encoder 252.

Reference is briefly made to FIG. 9 which graphically illustrates the waveforms on lines 1 and 2 generated by an incremental encoder. The encoder generates a reference signal on line 1 and a quadrature signal on line 2 which is 90° out of phase with the reference signal. By using logic circuits of the known type to detect changes in the levels of one signal and comparing them with the quiescent level of the other signal incremental and directional information responsive to the polarity of each signal may be generated. More specifically, motion pulses may be generated upon the zero crossings of each of the encoder output signals and a clockwise or counterclockwise rotational indicating signal are generated indicating the direction of motion.

In operation, the count control circuit 222 is the logic that takes the conditioned square wave outputs from each encoder 252 and the output of each encoder, as previously shown, comprises two signals, an A and an B input, which are each square waves and are 90 degrees out of phase. The count control circuit analyzes these signals and determines the direction of transducer rotation and then generates a pulse for each zero transition of both of those square waves. Consequently, four pulses are generated per cycle of the transducer 218 motion. These pulses are put out on two lines, an up line and a down line, to the up/down counter 224 that counts and accumulates them by counting up for the plus pulses and down for the minus pulses. At some point and time, the real time clock interrupts causes the data that is in the up/down counter 224 to be latched into the tri-state data latches 226. This insures, as previously mentioned, that the data is sampled from all axes simultaneously. The counter 224 in the present embodiment are absolute counters and their contents is not cleared out when the data is transferred into the data latches 226, that is, the counter 224 is allowed to continually count up and down. This results in valuable effects. As an example: it is not necessary to provide any buffer to store counts while clearing or resetting the up/down counter 224. Instead the counter 224 is allowed to run continuously, which contributes to the system reliability. Consequently, it can be seen that the data in counter 224 does not contain the amount of motion since the last time was taken out of the data latch 226, but instead is an absolute number over its range of sixteen bits.

Reference is now made to the input and output signal modules 82 and 84 as illustrated in FIGS. 10 and 13. Each of the modules as illustrated in FIGS. 10 and 13 contain electronics necessary to interface machine control signals to the systems data address and control busses. In addition, both modules 82 and 84 contain electrical isolators and power filters for noise suppression. The input signal module 82 may optionally include circuitry to turn off input detectors when not in use to decrease power consumption while the output module 84 includes current limiting features and may contain logic to turn off the appropriate drivers in the absence of input signals.

Reference is now made to FIGS. 10, 11 and 12 which illustrate a block diagram of the input module 82, a more detailed blocked diagram of the input module 82 and a schematic diagram of one of the plurality of logic circuits incorporated within the input signal module 82. In the embodiment illustrated, the input module 82 provides interfacing to the systems busses for each of 32 signals received from the controlled machine tool 30. More particularly, FIG. 10 illustrates an input buffer circuit 260 comprising noise isolations circuitry and logic signal enable circuitry 270 as described below. The input buffer circuit 260 is connected to a plurality of programmable peripheral interfaces 262 and 264 such as the Intel 8255 which includes three 8 bit ports. A control register on this particular module determines whether the ports on the device are input or output ports. The interface between the data 54 and address 52 busses and the programmable peripheral interface modules 262 and 264 is provided by the data bus transceivers 266 and address bus decoder 268.

Reference is now made to FIGS. 11 and 12. FIG. 11 illustrates a more detailed blocked diagram of the input module as illustrated in FIG. 10. The input signal module 82, as illustrated in FIG. 11, is designed to receive 32 machine input signals with 16 signals directed to the programmable interface controller 262 and with another 16 signals directed to another controller 264. These input signals may be generated by hardware, the machine tool or operator via a keyboard or other input device. In essence, the input signal module provides a means for the operator and machine to communicate with the processor module 52. An example of such signal is a signal indicating that a tool change operation has been completed. FIG. 12 illustrates a typical one of the input circuits within the buffer circuit 260 as well as one of the two input enable circuits 270 or 272.

Reference is now described to FIG. 12. Each of the logical input signals received from the machine tool constitutes a 24 volt signal which will be on or off, depending upon the operating condition of the machine. The input signals received are through resistor 276 which has one terminal connected to the anode of diode 280 which, in turn, has its cathode terminal grounded. The diode 280 provides reverse bias protection while the input resistor 276 provides current limiting protection. The anode of diode 280 is connected to the input of an optical isolator 282 comprising LED 284 and phototransistor 286. The cathode of the light emitting diode (LED) 284 which is optically coupled to the phototransistor 286 has its collector terminal connected to the pull-up resistor 288. The cathode of photo-transistor 286 is similarly connected to the RC filter 290 comprising the resistor-capacitor combination 292 and 294 which, in turn, is connected to the input of the Schmitt trigger 296. The output of the Schmitt trigger 296 is connected to port A of the programmable peripheral interface 262. Interfaces 262 and 264 may be of the type such as the Intel 8255-A5. It should be noted that the interface 262 (see FIG. 11) consists of three input or output ports A, B and C. A control register within this unit determines whether these ports are input or output ports. The A0 and A1 inputs to the module 262 determine which register or port is accessed. The $\overline{WR}$ input signal corresponds to the a write enable signal and the $\overline{RD}$ is a read enable signal. Both the write enable and read enable signals are interrupt signals generated by the processor 52.

Reference is now made to the lower part of FIG. 12 which illustrates the conditioning circuitry for the input enable signal which is generated by the interface 262 at port C. More particularly, the circuitry comprises a NAND gate 300 receiving at a first input terminal the enable signal generated from port C of the interface 262 and receiving at another terminal a reference voltage such a 5 volt reference signal communicated through the pull up resistor 301. The output of the NAND gate 300 is connected to the input of the optical isolator 302 comprising the LED 304 and photo-transistor 306. The output of the photo-transistor 306, that is, the emitter terminal is connected to the input of a Darlington pair driver 308 which is connected to the cathode of each of the light emitting diodes 284 in each of the other 15 signal conditioning circuits as illustrated in the upper part of FIG. 12. In operation, each of the 32 input signals are first passed through their respective isolators 282, filtered and then multiplex onto the system bus 56 using the programmable peripheral interfaces 262 and 264. Each of these input circuits must be enabled prior to the sampling of a particular input signal. The enable signal is generated (see FIG. 11) by the programmable interface 262 and 264 at port C. This enable signal is then inverted by the NAND gate 300 which turns on the optical isolators 302. The output of the optical isolator 302 supplies a 5 volt input to the Darlington pair driver 308 therein turning it on. The Darlington pair driver 300 sinks the input current of each of the 16 optical isolators through the cathode of the light emitting diodes 284. As an example, if a particular input is high, that is, 24 volts, current will flow through resistor 276 and the light emitting diode 284 of the optical isolator 282. The photo-transistor 286 then supplies a ground signal to the RC filter 290 whose output drives the Schmitt trigger 296. A logical high signal at the output of the Schmitt trigger 296 indicates that a particular DC input signal is on. If a particular DC input is low or less than the 24 volts required to indicate an "on" condition, little current will flow through the LED 284, thus leaving the photo-transistor 286 in an off or nonconducting state. This in turn drives the Schmitt trigger 296 to a low logic output level indicative of the fact that the particular dc input signal is off. Once both bytes of dc input information has been read from each group of 16 inputs to the interfaces 262 and 264 their respective enable signals are turned off to conserve power. Alternatively, if power conservation is of no consequence, the input logic should stay on. The input enable signal generated at port C of each of the interfaces 262 and 264 is turned off in response to the RESET signal which then turns off the optical isolator 304; this, in turn, drops the input voltage of the Darlington pair driver 308 to a low or a zero voltage condition causing the Darlington pair driver 300 to no longer sink current from any of the light emitting diodes 284. With the Darlington pair driver 300 off, very little current will flow through the resistor 276 and LED 284 therein conserving power and reducing heat dissipation until the respective input circuits are enabled by a subsequent system interrupt.

FIG. 11 illustrates a number of input and output signals used or generated by the input signal module 82. More specifically, the RESET signal, if in a low logic condition, causes the control register of the interface 262 or 264 to be reset and all of the ports to be set in an input mode. The P4X/signal when in a low logic condition identifies to the system 50 that the interfaces 262 and 264 are active on the data bus 56. The input signals ADR3/ and ADR2/ which are received by the address bus decoder 268 determine which of the interfaces 262 and 264 are active. The input signals ADR1/ and ADR0/ which are buffered by the inverting amplifiers 310 and 312 and received at the A0 and A1 inputs of the respective interface 262 and 264 determine which port or register in the interfaces 262 or 264 is active during a data transfer. The interrupt signal IORC/B when in a low logic condition causes the states of inputs to be gated to the data (DAT) bus 56. The interrupt IOWC/B when in the low logic condition causes the data on the DAT lines to be stored in a control register in the respective interfaces 262 and 264. The IORC/B interrupt signal controls the direction of data flow for the transceiver 266 and also enables the data drivers contained within the interfaces 262 and 264. Finally, the DC-IN-ACK signal is provided as a wrap around signal of the P4X signal and is used by the system 50 to detect whether or not a particular input module 82 is present. When this signal is in a low logic state it is indicative that a particular input module is located within the system.

Reference is now made to FIGS. 13, 14 and 15. FIG. 13 illustrates a block diagram of the output signal module 84. FIG. 14 illustrates a more detailed circuit diagram of the output module 84 and FIG. 15 illustrates a circuit representative of each of the 32 output conditioning circuits included in module 84.

Reference is again made to the output signal module 84 of FIG. 13. The construction or layout of module 84 is substantially identical with that of the input signal module 82 with the exception that the output driver module 84 provides an interface for a number of command or logic signals (32) between the various busses of the system 50 to the controlled machine. The output driver module 84 supplies a plurality of 24 volt signals to the machine therein controlling various machine functions. Data and address information are obtained from the respective data bus and address bus by the data bus transceiver 326 and the address bus decoder 328. This information is then stored in a pair of programmable peripheral interfaces 322 and 324 prior to their selective transfer to each of the driver conditioning circuits 318 contained in the output driver 320. Each driver conditioning circuit 318 provides for noise suppression, voltage regulation and current limiting.

Reference is now made to FIG. 14 which illustrates a more detailed schematic diagram of the output driver module 84. The address bus decoder 328 receives the input signals ADR1, ADR0 and P5X. The P5X is essentially a clocking signal for each of the interfaces 322 and 324 and when in a low logic state selects the output signal module 84 as being active on the data bus. The ADR3 and ADR2 signals are gated to the data bus transceiver and to the interface 322 and determine which module is active. The P5X signal is fed back to the processor 90 and defines the DC-OUT-ACK acknowledge signal for the processor module 52. The ADR2 and ADR3 signals, which are buffered by inverting amplifiers 320 and 322, determine which port or register in either of the interfaces 322 or 324 is acted during data transfer. The additional input signals to the circuit shown in FIG. 14 include the IOWC/B interrupt signal which when in a low state causes the data on the data lines (DAT/ 0-DAT/ 7) to be written or stored in the control register or ports A and B of either interface 322 or 324. The RESET signal when in a low state causes the control register of the interfaces to be reset and all of the ports (A, B and C) to be set in the input mode. The OUTPUT DISABLE signal is transferred to the output circuits 320 and is discussed in conjunction with FIG. 15.

FIG. 15 illustrates one of the 32 driver conditioning circuits 318 contained in the output circuit module 320. More specifically, each driver circuit 318 comprises a positive OR gate 334, receiving at one terminal, the OUTPUT DISABLE signal and at another terminal one of the output signals from ports A or B of the interfaces 322 and 324. In the embodiment illustrated in FIG. 15 the AND gate 334 receives power from a 5 volt source. The output of the gate 334 is connected to the input of an optical isolator 336 comprising the LED 338 and photo transistor 340. The cathode of diode 338 is connected to a 5 volt power supply through the current limiting resistor 342. The output or collector terminal of the photo-transistor 340 is connected to the input of driver 346 and to one terminal of the pullup resistor 344. Resistor 344 and driver 346 are appropriately connected to a second higher voltage source such as a 24 volt source. The output of the driver 346 is connected to the input terminal of a voltage regulator 348 having its output connected to one terminal of a current limiting resistor 350, the other terminal of which is connected to an appropriate input point in the controlled machine and is also fed back to the adjust terminal of the regulator 348. In addition, the other terminal of resistor 350 is connected to the anode terminal of diode 352 which has its cathode grounded. The diode 352 provides negative voltage transcient spike suppression to protect the machine tool. The voltage regulator 348 provides short circuit protection if these outputs are shorted by the operator. In operation, the OUTPUT DISABLE signal received by gate 334 must be in a high logic state before any of the 24 volt output signals can be turned on. The output ports A and B of either interface 322 or 324 controls the state of each individual 24 volt output signals. A high logic state on the individual outputs of the interfaces 322 or 324 keeps the LED 338 of the respective circuit from conducting. In this no light situation the diode 338 keeps the photo-transistor 340 from conducting, thus allowing the input voltage to the driver 346 to rise above a threshold level. If the driver is chosen to be of the type such as the UDN982A, the threshold voltage is approximately 0.4 volts. When the input voltage to the driver 346 is high enough the driver 346 turns on and supplies a 24 volt signal to the voltage regulator 348. If either of the OUTPUT DISABLE signal or if the output signals from ports A and B of the interfaces 322 or 324 are low, the diode 338, within the optical isolators 336, will conduct, thus causing the photo transistor 340 to conduct and drive its output to ground. Consequently, the input voltage to the driver 346 is less than its threshold which causes the driver 346 to turn off and prevents the generation of a 24 volt output signal.

Figure 17:
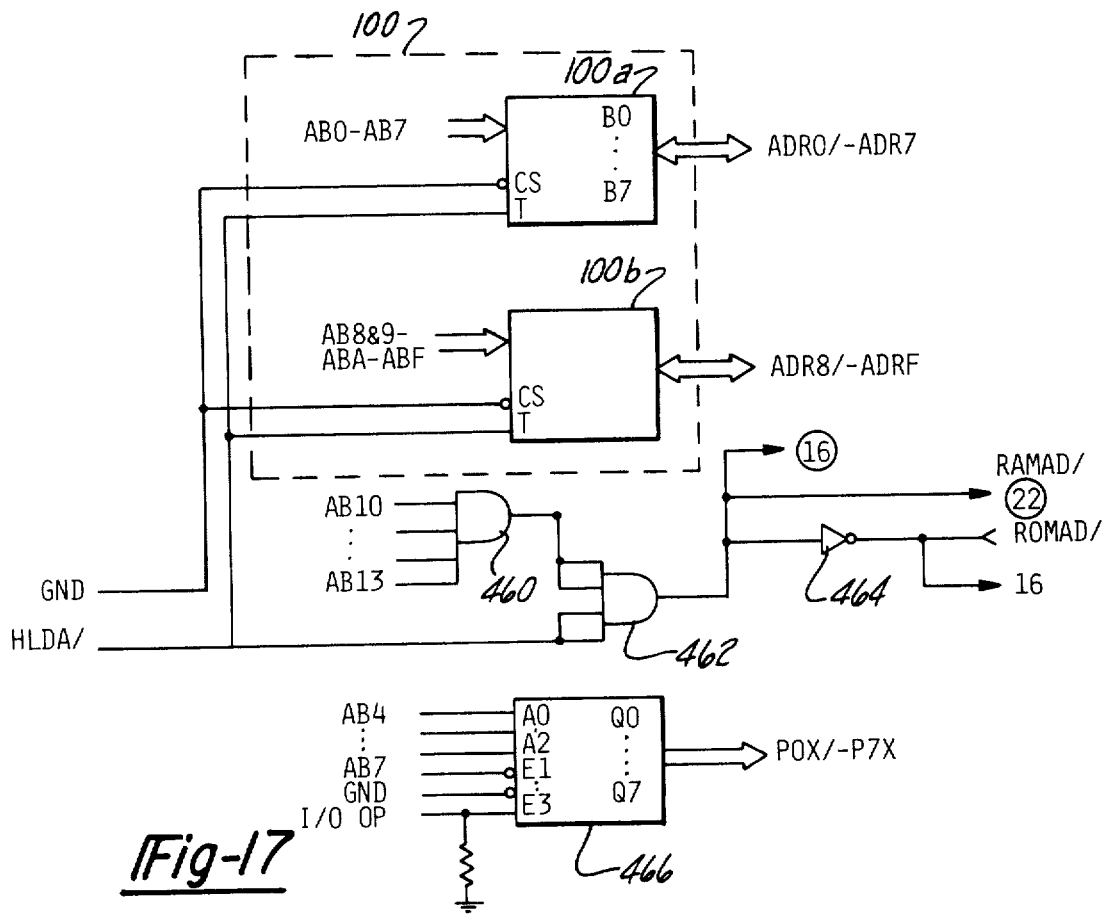
FIG. 17 illustrates the address transceivers and tens decoder of the processor module.
Figure 18:
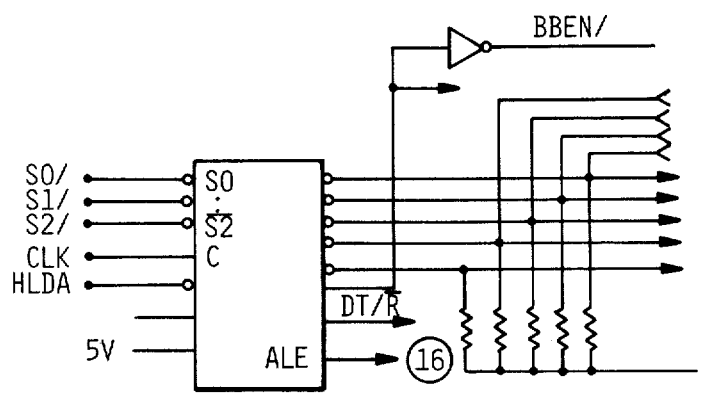
FIG. 18 illustrates a bus controller.

Reference is now made to FIGS. 16 through 22 which illustrate a detailed embodiment of the processor module 52. The numerals located within circles identify the Figure numbers from which various signals are transmitted or received. Those numbers adjacent discrete components are indicative of the pin locations on each component. In addition, the various logic signals and the identification of the various buses, are identified by alpha numeric code names adjacent thereto designation address or data memory locations. FIGS. 16 and 17 illustrate the relationship between the processor 90, the address latch 94, the address bus drivers or transceivers 100. The byte swap module 94 and the data bus drivers or transceivers 102 are contained in FIG. 19 and the bus controller 104 is illustrated in FIG. 18. Reference is again made to FIG. 16 which illustrates the more detailed interconnection between the processor 90 and the address latch 94, the system clock 400, the acknowledge logic 402, fail-safe timer 452 and the request/grant logic 420. In the embodiment shown, the processor 90 is of the type such as the Intel 8086 microprocessor. This device is a 16 bit HMOS microprocessor with multiplexed data and address signals transmitted on internal bus 92. The output of processor 90, that is, the data and address bits AD0-ADF, are communicated via the internal bus 92 to the associated terminals of the data latches 94a-c which in response to an address latch enable (ALE) signal generated by the bus controller 96 (see FIG. 19) latches the data into the respective data latches 94a-c. The ALE signal is decoded from the status of the processor bits S0, S1, and S2. Table 1 below illustrates the decode logic for the processor status signal bits.

TABLE 1

| S2 | S1 | S0 | |
|---|---|---|---|
| 0 | 0 | 0 | Following IA |
| 0 | 0 | 1 | Followed By Read I/O |
| 0 | 1 | 0 | Followed By Write I/O |
| 0 | 1 | 1 | Halt |
| 1 | 0 | 0 | Instruction Fetch |
| 1 | 0 | 1 | Read Memory |
| 1 | 1 | 0 | Write Memory |
| 1 | 1 | 1 | Passive (No Bus Cycle) |

The processor module 52 further includes digital gating logic 404 which detects whether or not an I/O operation is in progress and this data is latched into the address latch 94c. This digital logic 404 comprises the exclusive OR circuit 406 communicating with the NAND gate 408 which receives at another input the output of inverter 410. The output of NAND gate 408 is connected both to the data latch 94c and to the inverter 412, the output of which is similarly connected to the data latch 94c.

The processor module 52 further includes request/grant logic 420 which interconnects the processor module 52 with the peripheral control module 62. More specifically, those familiar with the operation of the Intel 8086 processor will note that upon grounding the MN/NX input, a maximum configuration for the microprocessor is obtained. This maximum configuration controls the operation of the request/grant ($\overline{RQ}/\overline{GT0}$, $\overline{RQ}/\overline{GT1}$) signals. These signals are utilized to force the processor 90 to release the bus 92 at the end of a current bus cycle. This control is used by the DMA controller 152 to transfer data to and from the RAM memory 112 and the CRT controller 158 for dispaly on the CRT.

The request/grant digital logic 420 communicates between the DMA controller 152 and processor module 52 during those intervals of time when the CRT controller 158 requires data. More specifically, during those intervals of time when the CRT controller 158 requires data, it generates a request signal to the DMA controller 152. In response to this request signal, the DMA controller 152 generates a HOLD signal which is communicated to the digital logic 420 by a line 422. In response to this signal, the logic 420 will generate a hold acknowledge, HLDA, signal which indicates to the DMA controller 152 that the bus 56 is available for data transfer. The digital logic 420 comprises the latching flip flops 424 and 426 which are responsive to the Hold signal generated by the DMA controller 152, a reset signal (RESET) and clocking (CLK) signal. The noninverting outputs of the D latch flip flops 124 and 126 are connected to the exclusive OR gate 428 which, in turn, is connected to the inverter 430, the output of which is used to gate the tri-state buffer 432, the output of which is biased relative to a five volt reference and which is also connected to the $\overline{RQ/GT0}$ signal and to the inverter 434. The output of inverter 434 and the respective non-inverting outputs of the D latches 424 and 426 and a clocking signal are input into the NAND gates 436 and 438. The output of NAND gate 438 and the RESET signal are connected to a positive OR gate 440. The output of gates 436 and 440 are input to another D latch flip flop 442 which may be called the hold acknowledge flip flop, the output of which is an inverted Hold Acknowledge signal (HLDA/) which is generated at its inverting output. The HLDA/ signal is connected to inverter 444. In operation, upon receipt of the Hold signal from the DMA controller 152, the D latch flip flop 424 will set. Upon the next clock pulse the second D latch flip flop 426 will set. The exclusive OR gate 428 gates the signals to form a single pulse which is one clock period long and enables the tri-state buffer 432 to input a pulse (low state) to the $\overline{RQ/GT0}$ input of processor 90 indicating that another bus master desires to gain control over the system's buses. The processor 90 will then generate a signal pulse, having a single clock width period, on the above-mentioned input line indicating that the processor 90 has allowed the bus to float. This pulse sets the hold acknowledged flip flop 442. The HLDA signal, as previously mentioned, indicates to the DMA controller 152 that it may use the bus for data transfer. When the DMA data transfer is complete, the DMA controller 152 causes the HOLD signal to go to a low logic state. The flip flop 424 is thereby reset, which will in turn, cause flip flop 426 to reset on the next clock pulse. The exclusive OR gate 428 will again output a single pulse to enable the buffer 432 to input a pulse to the processor 90 to indicate that the processor 90 can thereby resume control of data flow.

During the last clock cycle of each instruction, the processor 90 samples the interrupt request signal (INTR) generated by the programmable interrupt controller 120. If this signal is in a high logic state the processor 90 enters an interrupt acknowledge operation. The interrupt service routine of the 8086 processor is entered via an interrupt vector look-up table located in the system memory. When the interrupt acknowledge signal is decoded from the status of the S0, S1 and S2 bits by the bus controller 104, the INTA signal causes the programmable interrupt controller 120 to put the address of the service routine of the interrupt on the address bus 54. The processor 90 will then initiate an indirect jump to this address. The processor 90 generates a bus enable signal (BHE) to enable data from memory to the most significant byte of the internal data bus 92. The most significant byte corresponds to those address locations AD8-ADF. The memory address bit AB0 and the BHE signal are used to address the memory banks of the RAM 116. Reference is made to the clock 400 illustrated in FIGS. 2 and 16. The system clock 400 may be of the type such as the Intel 8284 which includes a clock generator and driver. The clock 400 consists of a 15 mHz crystal oscillator 450. The clock 400 provides the RESET signal to the processor 90 and also provides a Schmitt trigger input (RES) and a synchronizing flip flop to synchronize the system RESET signal to the falling edge of the clock. The clock 400 also provides the synchronization of the READY signal which is utilized by the processor 90. The READY signal is generated in response to the acknowledge signals generated by the other modules of the system. One skilled in the art will realize that when any processor initiates a memory read or write cycle, I/O or interrupt operation, the processor may enter a wait state until a READY signal is received which indicates that the processor may proceed. In the absence of receiving an acknowledge signal, that would normally generate a READY signal, the processor module 52 contains an auxilliary fail-safe timer 452 which comprises a monostable multivibrator which has a relatively short time period, such as 4 milliseconds. The timer 452 is continuously restarted by the ALE signal generated by the bus controller 104. If an operation is started which causes the processor 90 to enter a wait state, but no acknowledge signal occurs within the 4 millisecond time period, the timer 452 will generate a pseudo READY signal to restart the processor and further generates an interrupt signal indicative of the fact that an error has occurred and that a fault condition should be indicated by the system 50.

Reference is made to FIGS. 2 and 17, which illustrate the connection between the address latches 94 and the address bus drivers 100. The address bus drivers 100a and 100b are used to transmit 16 bits of address information between the processor module 52 and other modules within the system. In the embodiment illustrated only the low order bits, that is, bits AB0-AB7, AB8, AB9 and ABA-ABF are transmitted on the address bus 54. The most significant bits of address AB10-13 are used to detect a RAM or ROM operation. The address transceivers 100a and b are normally used to transmit the address from the processor module 52 to other modules within the system. During direct memory access operations of the DMA controller 152, the HLDA signal will be directed to a low logic state to allow the address to be transmitted directly from the DMA controller 152 to the processor module 52 and its associated random access memory. FIG. 17 further illustrates a 3 to 8 line decoder which decodes the address bits, AB4, AB5 and AB6 and which is enabled by the address bit AB7 and the I/O operation signal ($\overline{I/OOP}$). The purpose of decoder 466 is to decode the tens digit of the I/O port addresses and therefore reduce the amount of decoding required by the I/O ports on the other system modules. The output signals P0X-P7X are connected to the system bus.

Reference is made to FIGS. 2 and 18, which illustrate the interconnections of the bus controller 104. This device may be of the types such as the Intel 8288, which is a bi-polar component and which provides command and timing generation. As previously mentioned, the processor 90 status bits S0, S1 and S2 are decoded and a variety of commands are issued. More particularly an address latch enable (ALE) signal, a data transmit/receive (DT/$\overline{R}$) and a data enable (DEN) signal. The data transmit/receive signal establishes the direction of data flow and when in a high logic state is indicative of data flow from the processor 90 to memory or the various input/output modules of the system. Alternatively, when the data transmit receive signal is in a low logic state, the flow of information is from the memory of the input/output devices to the processor 90. The data enable signal enables the data transceivers 102 onto either the local bus 120 or the systems data bus 56.

Figure 19:
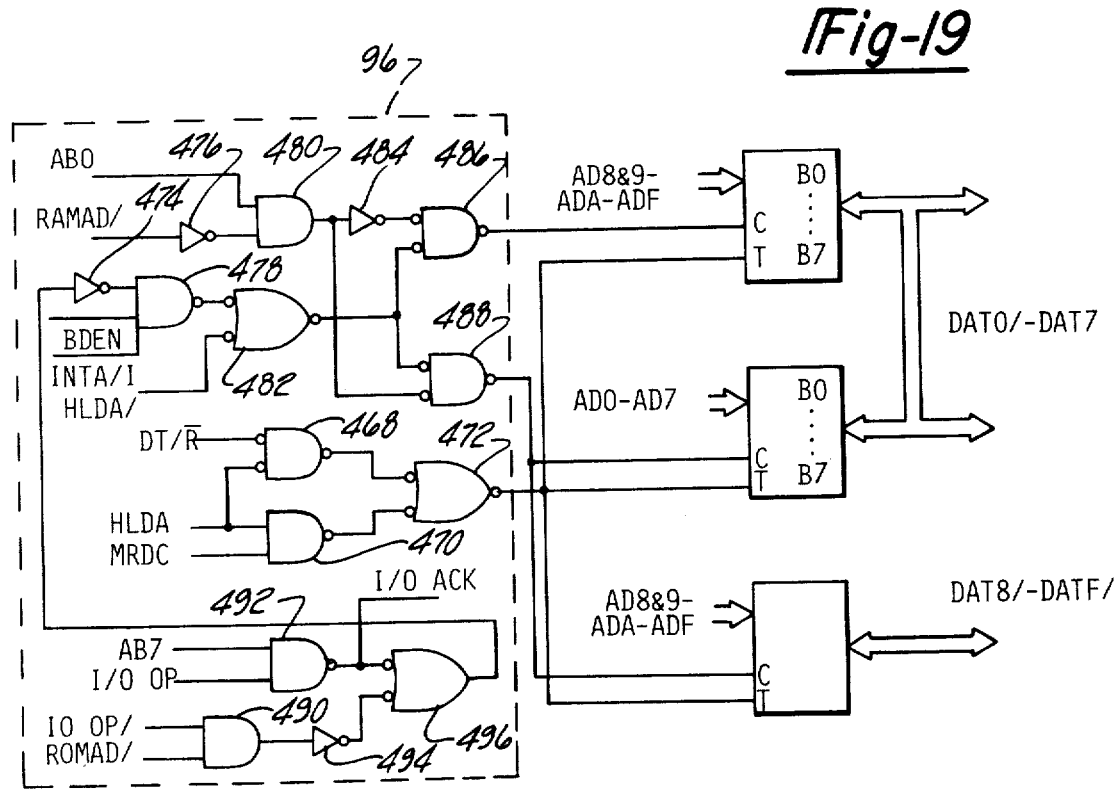
FIG. 19 illustrates byte swap logic and data bus transceivers.

Reference is now made to FIGS. 2 and 19 which illustrate the interconnection between the processor 90, the byte swap logic 96 and the data bus drivers or transceivers 102. As shown in FIG. 19 the system utilizes three transceivers 102a–c which are used to transfer data from the processor 90 to other modules within the system 50. The direction of data transmission is controlled by the data transmit/receive (DT/R̄) signal which is generated by the bus controller 104. During any direct memory access operation, the HLDA (or HLDA/) signal generated by the digital logic 420 of FIG. 16 is inhibited by the data transmit/receive signal and allows the memory read control (MRDC/) signal generated by the bus controller 104 to cause data to be transmitted on the data bus 56. The data bus 56 comprises bits DAT0/through DATF/. The data bus transceivers 102a–c are enabled when the address called for by the processor 90 is for a device that is not located on the processor module 52. During this situation, the data bus enable signal (DBEN) is in a high logic state if the interupt (INTA/) signal is not being acknowledged. Alternatively the transceivers are enabled by a DMA operation whereupon the HLDA/ signal is low. The corresponding 8 bits of output of either transceiver 102a and 102b are wired together and in cooperation with the byte swap logic 96 allows a byte from either the low byte of memory (AD0-AD7), or the high byte of memory (AD8-ADF) to be transmitted on the low byte of the data bus 56 (DAT0/-DAT7/). Controlling the data bus 56 in this manner permits an 8 bit device such as the DMA controller 152 or the CRT controller 158 to be interfaced with the 16 bit processor 90. The logic gating circuits used to control the direction of data transfer and which interface with the bus controller 104 and processor 90 comprise the positive NAND gate 468, the NAND gate 470 and the positive OR gate 472. As mentioned the data bus transceivers 102a–c are enabled when the address called for is for a device that is not located on the processor module 52. During this situation, the input signal to the inverter 474 is low. The input signal to inverter 474 may be designated as an on board address signal and is generated in cooperation with the logic circuitry 490 through 496. In addition to the on board address signal being in a low logic state, the data bus transceivers 102a–c are activated when the data bus enable (BDEN) signal is high and when an interrupt is not being acknowledged. When the interrupt is not being acknowledged, the INTA/ signal is driven to a high state. As can be seen from FIG. 19 the output of inverter 474 is communicated to the NAND gate 476 which has, as additional input, the data bus enable (BDEN) signal and the interrupt acknowledged (INTA) signal. The output of the NAND gate 478 is communicated to the positive OR gate 482 which, in turn, is communicated to the transceivers 102 via the positive NAND gates 486 and 488. The positive OR gate 482 may be enabled during a DMA operation during which time the HLDA/signal is in a low logic state.

Figure 20:
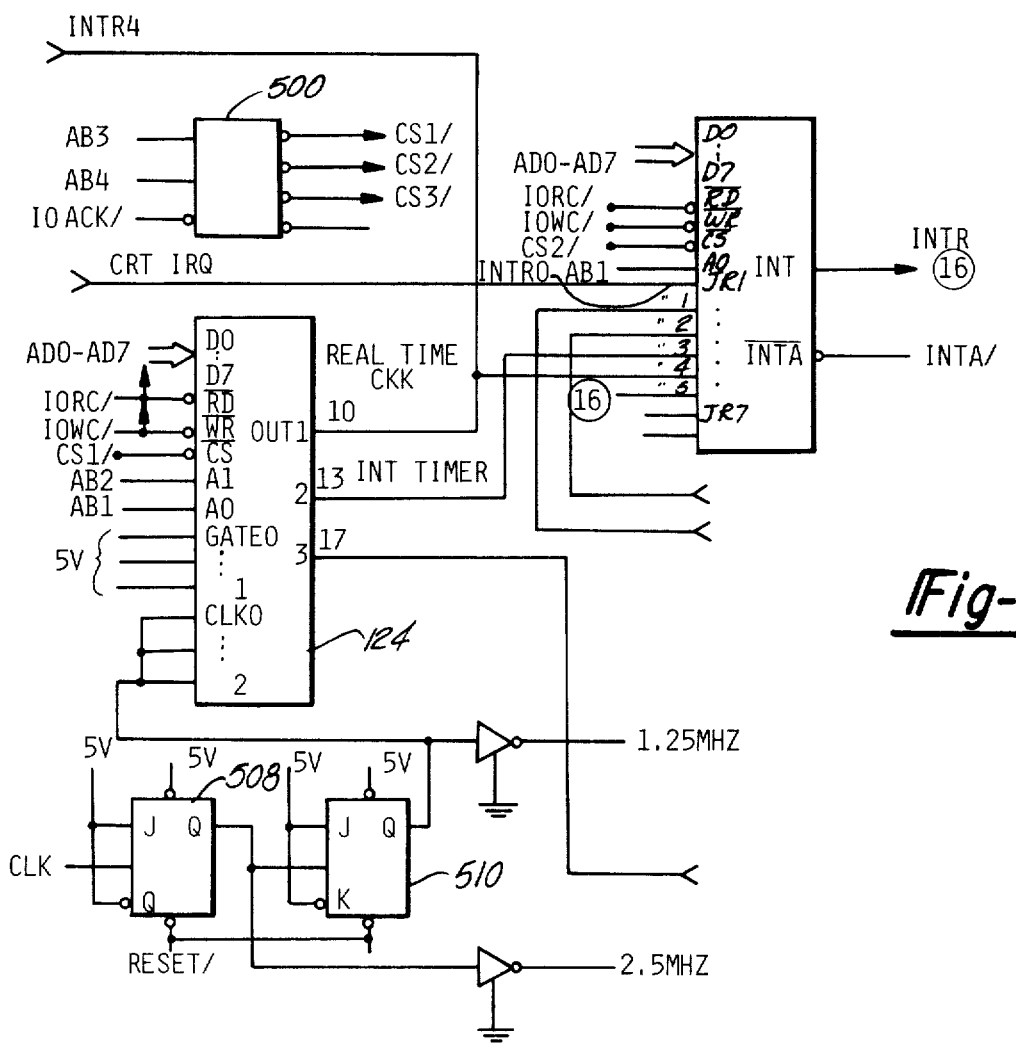
FIG. 20 illustrates a programmable interface controller, programmable interrupt timer and chip select decoder.
Figure 21:
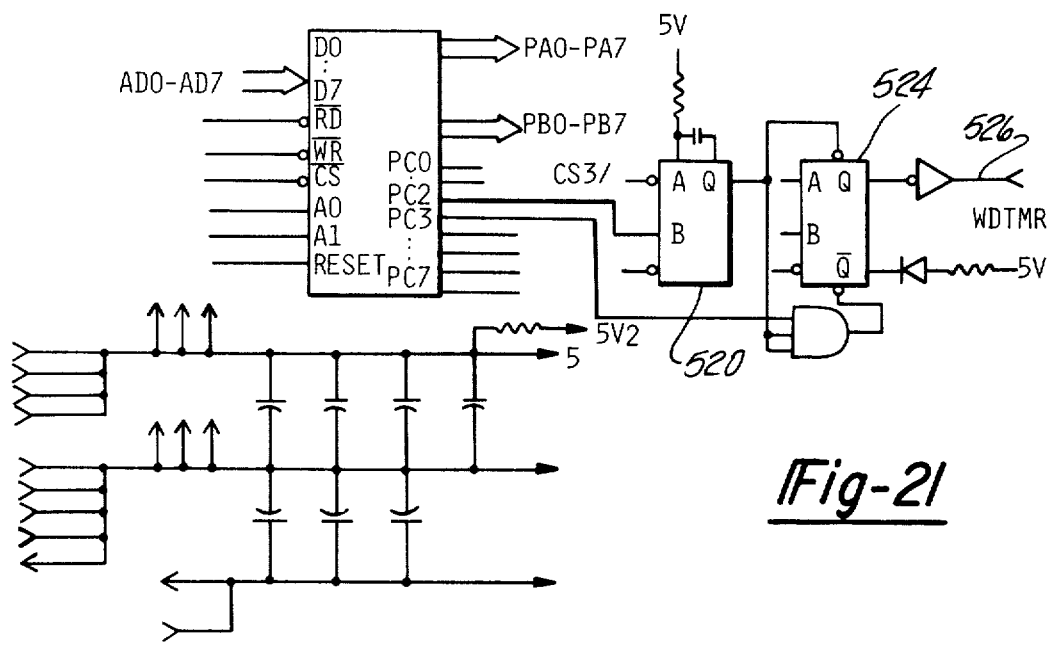
FIG. 21 illustrates a programmable peripheral interface and a watchdog timer.

Reference is made to FIGS. 2 and 20 which illustrate the programmable interval timer 124, the programmable interrupt control 120 and a chip select decoder 500. The programmable interval timer 120 generates a real time clock interrupt, (INTR) a general purpose interval timer signal and a baud clock for the systems serial interfaces. The programmable interface timer 124, may be of the type such as the INTEL 8253-5 and is connected by the internal address bus 92 and more particularly to bits AD0-AD7. The INTEL 8253-5 consists of three identical 16 bit, pre-setable down counters and a mode control register. The contents of the mode register is available in a known manner with simple read operations. The output of each of the counters is placed on lines 502, 504 and 506 and correspond to the real time clock interrupt signal, the generate purpose interval timer signal and the baud clock for the serial interfaces respectively. The clock interval for each of the three timers in the timer 124 is generated by the two JK flip flops 508 and 510. In the embodiment shown, the clock input to each of these timers is 1.25 mHz which corresponds to 0.8 microseconds.

Reference is again made to FIGS. 20 and 2 which illustrate the interrelationship of the programmable interrupt controller 120 of the system. The controller 120 may be of the type such as the Intel 8259A. Data is transferred to and from controller 120 from the processor 90 on the internal data bus 92 via lines AD0-AD7. The I/O read control signal (IORC/) is connected to the R̄D̄ input. The I/O write control (IOWC/) is connected to the W̄R̄. The chip select input (CS) is connected to the chip select decoder 500. The address bus signal AB1 is wired to the A0 input of controller 120. The controller 120 generates an interrupt request signal (INTR) to the processor 90 and receives an interrupt acknowledge signal (INTA/) returning from the processor 90 via the bus controller 104. The interrupt request signals (INTR0-INTR7) are connected to the interrupt request inputs (IN0-IR7) of the controller 120. As an example of these interrupt request signals, the INTR0 signal is generated by the CRT while the INTR5 signal is the output of the fail-safe timer 452. In operation when one or more of the interrupt request lines (INTR0-INTR7) is in a high logic state corresponding bits in the controller 120 are set. The controller 120 thereupon evaluates these requests and sends an interrupt request signal (INTR) to the processor 90. The interrupts utilized by the present system 50 are displayed in Table II.

| INTERRUPT | |
|---|---|
| 0 | CRT |
| 1 | TxRDY |
| 2 | RxRDY |
| 3 | Timer |
| 4 | Real Time Clock |
| 5 | Fail Safe Timer |

Reference is now briefly made to FIGS. 20 and 2 which illustrate the relationship between the programmable peripheral interface 126 and the timer 428. Interface 126 may be of the variety such as the Intel 8255A-5 having the processor internal data bus AD0-AD7 lines wired to its corresponding input pins. The additional inputs to the interface 126 comprise the IO/read control (IORC/) connected to the read input and the I/O write control (IOWC/) connected to the write input. The chip select input (CS) is activated by the CS3 output transmitted from the decoder 500. The bus signals AB1 and AB2 are wired to the A0 and A1 inputs of the controller. Reference is made to output port C and in particular pins PC2 and PC3 which are connected to the watchdog timer 128. The purpose of this timer 128 is to detect when the servo output module 70 is not being updated and therefore the control system is operating in an open loop mode. In this configuration the timer 128 generates a timing signal to cause an emergency stop. More specifically the watchdog timer 128 includes a retriggerable mono-stable multi-vibrator 520. This monostable has a time constant that is greater than the time necessary for two update signals to be sent from the processor 90 to the servo output module 70. In the present embodiment the time constant of the monostable 520 is 34 milliseconds. In the normal mode of operation the servo module 70 is updated every 12 milliseconds which corresponds to the real time clock interrupt signal. Each time the servo module 70 is updated, a pulse is generated and communicated to the mono-stable 520 via line 522 to reset the mono-stable 520. If a period of time, corresponding to the time constant of the monostable, passes without the monostable 520 being reset, the flip flop 524 is set which generates a signal on line 526 to indicate to the processor 90 that the system should be stop and the operator notified.

Figure 22:
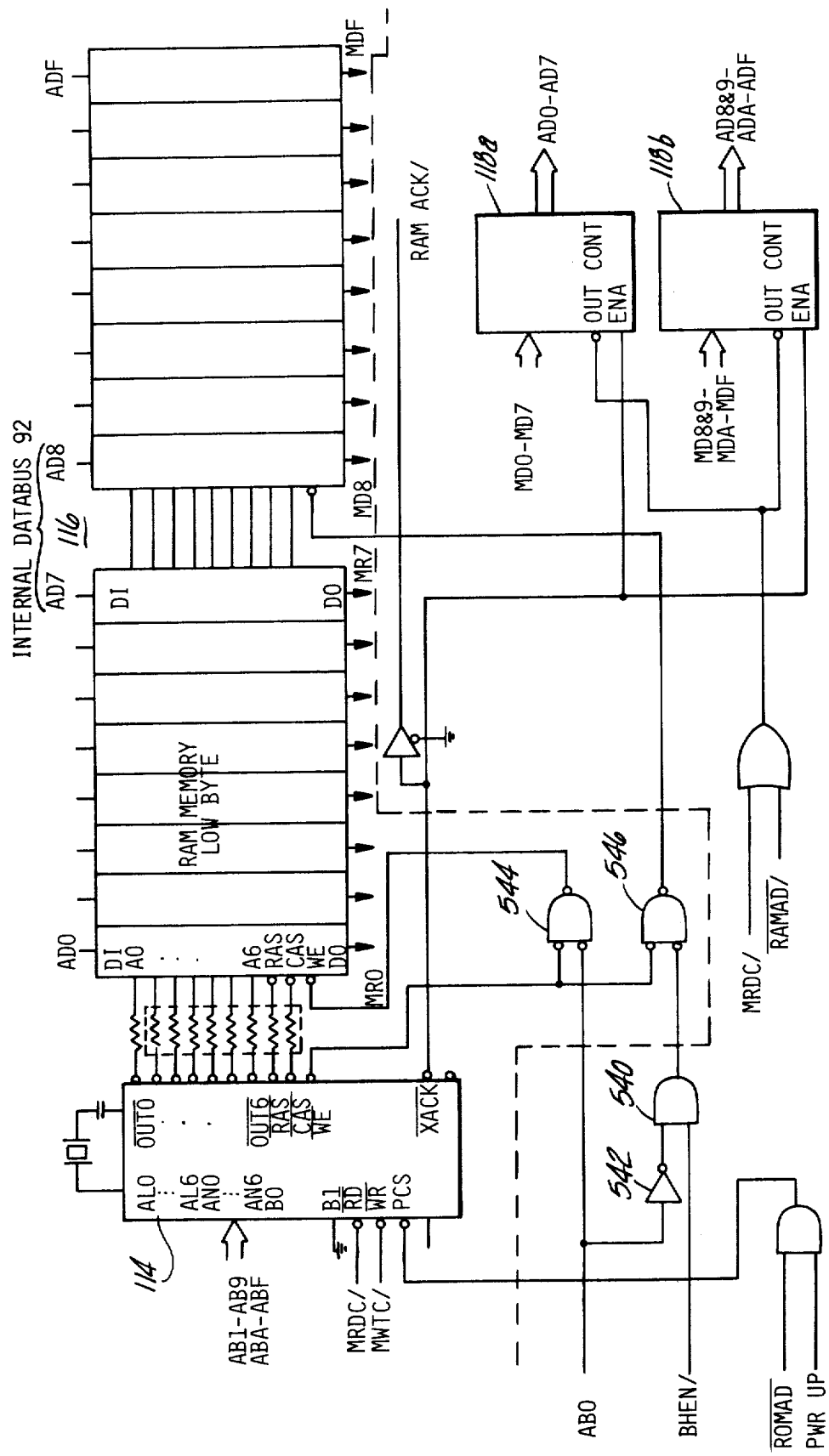
FIG. 22 illustrates the structure of the system's memory.

Reference is briefly made to FIG. 22 which is a circuit diagram illustrating the connections between the dynamic RAM controller 114, the random access memory 116 and the data latches 118a and b. In the embodiment illustrated the random access memory 116 contains 32K bytes of dynamic RAM. A random access memory such as the Intel 2118 having both column address strobe ($\overline{CAS}$) and row address strobe ($\overline{RAS}$) may be used. The dynamic controller 114 provides the address multiplexing and strobes for the random access memory 116. One such controller 114 is the Intel 8202. The address bus signals AB1-AB7 are wired to the low order address inputs (AL0-AL6) of the dynamic controller 114. These inputs are used to generate a row address for the controller 114. The address bus signals AB8-ABE are wired to the higher order address (AH0-AH6) of the dynamic controller 114. These inputs are used to generate the column address for the controller 114. The address bus signal ABF is wired to the bank address input (B0). The outputs ($\overline{OUT0}$-$\overline{OUT6}$) are designed to drive the address inputs of the RAM 116. The row address strobe and column address strobe signals are used to latch the row and column addresses into the memory of the RAM 116. The write enable ($\overline{WE}$) output is designed to drive the corresponding write enable input of the RAM 116. The transfer acknowledge ($\overline{XACK}$) output signal is a strobe that indicates that valid data is present during a read cycle or write cycle. The transfer acknowledge signal is used to latch valid data from the memory array of the RAM 116 into the memory data latches 118a and b. In addition, the transfer acknowledge signal is used to generate the RAM acknowledge (RAM ACK/) signal for the processor 90. In the embodiment illustrated the memory of the RAM 116 is divided into two banks of 16K bytes each. The first bank is associated with the lower half of the processors 16 bit data bus (AD0-AD7) and the other bank is associated with the upper half of the bus (AD8-ADF). The address bytes AB1-ABF are used to simultaneously address a specific byte location in both the upper and lower banks. The AB0 address bit is not used for memory addressing but is used in memory bank selection. The lower bank, which contains the even-address bytes, is selected when AB0 is low. The upper bank, containing odd-address bytes is selected by the bus enable signal. The AB0 signal is communicated to the AND gate 540 through the inverter 542 and to the positive NAND gate 544, the output of which is connected to the write enable terminal of the lower bank of memory of the RAM 116. The output of gate 540 is communicated to gate 546 the output of which is input to the write enable terminal of the high bank of memory of the RAM 116. The memory latches 118a and b latch the output of the data arrays of the RAM 116 when the transfer acknowledge signal occurs thus indicating that data is valid. When the transfer acknowledge signal goes to a low logic state data is transmitted from the input (MD0-MDF) to the output AD0-ADF of the data latches 118. These data latches are tri-state devices and are kept in their high impedance states except when the MRDC/ or RAMAD/ signals are low.

Reference is briefly made to FIG. 23 which illustrates in more detail the additional hardware necessary to effect a complete CRT control circuit. This hardware includes the DMA controller 152 and an associated 8 bit input-output port device which comprises the buffer 150. A dot clock oscillator (not shown) is connected to a frequency counter 552 which generates a character clock synchronous with the dot clock, a D latch flip flop 554 provides timing delay of the vertical and horizontal sync signals, video blanking and reverse video signals generated by the CRT controller 158. The operation of the Intel 8275 CRT controller is available for manufacturer's specifications. However for completeness a typical operation of the controller 158 as applied to this system 50 is discussed below. One row time, before the end of the vertical retrace signal, the CRT controller 158 requests a DMA transfer. The DMA transfer occurs in bursts of 8 characters per transfer event until the input buffer of the CRT controller 158 is filled. When the vertical retrace signal ends, the CRT controler 158 transfers the row buffer to its output and requests DMA information transfer into a second row buffer. This transfer will again occur in bursts of 8 characters until that particular row buffer is filled. On the negative going edge of the vertical retrace signal (VRTC) the controller 158 starts shifting each character to the character outputs of the controller 158 so as to select the specific character in the character prom 166. This is done synchronously with the character clock 162. The line counter outputs of the CRT controller 158 completes the address selection to the character prom 166 and selects a particular line number of the character to be generated. This line number is transferred to the shift register 168 and then transmitted serially to the CRT 178 via the composite video input signal. During this time the electron beam of the CRT 178 is sweeping the first line. When this line sweep is completed the horizontal retrace signal (HRTC) causes the electron beam to return to the left side of the tube. At the end of the horizontal retrace signal, the line counter within the controller 158 is indexed one count and the character buffer again proceeds to sequentially shift the first row of characters to the character terminal outputs of the controller in synchronism with the character clock 162. The line counter within the controller 158 is again shifted causing the dots to be displayed on the tube face. This process continues until the line counter has completed the programmed number of line sweeps for the particular display format. At this time the row buffers are interchanged, the next row of character displays begun and a new DMA request is initiated to the DMA controller 152. The DMA controller 152 then transfers the third character row into the first row buffer. The second character row now repeats the above process and shifts its characters line by line and in sequence to the CRT controller 158 interface pins. These characters are then written on the display tube line by line in the same manner as the first row. Following the second row, the row buffers are again interchanged, with the third row now being in the row buffer originally used for the first row characters. The row buffer used for the second row of characters is now filled with the characters of the fourth row via the DMA burst transfer. This process continues until an end-of-frame-stop-DMA control code is encountered by the CRT controller 158 or until the vertical retrace signal is generated signifying the end of one frame of display. The vertical retrace signal thereupon causes the electron beam to return from the lower right hand corner of the display to the upper left hand corner and the character displays are then continued. Reference is made to FIGS. 25 through 27 which illustrate the need for delaying the horizontal retrace, vertical retrace, reverse video, and video blanking signals from the CRT controller 158. With reference to FIG. 25 it should be noted that time starts on the left hand side upon the negative going edge of the horizontal retrace signal (HRTC). At this time the first character output occurs at the interface of the CRT controller 158 and remains at this interface for the duration of the first character clock signal as illustrated in line 5. An access time of 150 nanoseconds is required before the character output is reliable for use by the decoder and character proms 164 and 166. An additional 70 nanoseconds is also required before the output of decoder prom 164 is reliable and can be used for accessing the character prom 166. An additional 450 nanoseconds is further required for the access time of the character prom 166 before the character data is stabilized and reliably available to the serial shift register 168. As shown on lines 3 and 9 a shift register load pulse occurs on the eighth dot clocking pulse. As can be seen, a complete delay of one character clock time occurs from the time of the downgoing edge of the horizontal retrace signal until the character is accessed from the character prom 166 and clocked into the parallel input-serial output register 168. Consequently it can be seen that character number one (1) is not shifted to the video input of the CRT 178 until the second downgoing transition of the character clock which occurs after the time that the horizontal retrace signal is switched to a low logic state or ground. In a similar manner, the vertical retrace signal must be delayed one character time in order that it will occur synchronously with the character outputs appearing on the video signal to the CRT 178. In addition if a reverse video or video blanking signal is required in conjunction with a particular character, that condition occurs at the output of the CRT controller 158 in synchronism with the character output from that controller 158. In order for these outputs to be properly synchronized with the video presentation on the display they must be delayed by one character clock pulse. Thus the quad-D flip flop 544, which is shown in FIG. 23, serves to delay each of the four above mentioned signals by one character clock time in order to maintain synchronism with the serial characters shifted from the 8 bit shift register 168. Reference is briefly made to FIGS. 26, 27, 28 and again to FIG. 24. As configured in this system 50, the display format utilizes a total of 18 character rows that may be displayed for each frame. In addition 34 characters may be displayed for each line of video information. Each horizontal retrace signal comprises 14 characters and each vertical retrace signal is provided after four row times (defined below). The 6.048 MHz dot clock 160 provides the basic frequency for individual bits corresponding to the individual dots on the screen face. One cycle of the character clock 112 corresponds to 8 periods of the dot clock thereby providing a dot matrix which is 8 characters wide. As illustrated in FIG. 26, 14 character clock pulses are counted within the CRT controller 158 in order to generate the horizontal sync signal. In addition 34 character clock pulses are counted within the controller 158 in order to determine the start of the next horizontal retrace signal. In this application, a row time consists of 12 lines or 12 horizontal retrace signals thus completing the 8 by 12 dot matrix specified for the display of each character and the generation of spacing between character rows. As illustrated in FIG. 28 the vertical sync signal is in a high logic state for 48 horizontal retrace pulses which correspond to four row times. It can be seen that 18 row times or a total of 216 horizontal retrace pulses occur between vertical sync signals. This timing results in a vertical sync rate of 59.7 hertz. In order to achieve horizontal synchronization of the video display the period of the vertical sync signal is adjusted to a period of 500 microseconds by including a monostable multivibrator 556. Multivibrator 556 is necessary since the vertical sync signal timing, available from the controller 158 (Intel 8275) normally results in a vertical sync pulse that is too wide for the composite video input into the CRT 178. This vertical sync pulse is therefore shortened in time by use of the monostable 556.

Double size height character displays are provided to the CRT 178 by means of the decoder prom 164 and the attribute bits GPA0 and GPA1 which are generated by controller 158. The address of the decoded prom 164 can be subdivided into two portions. The lower significant four bits of address is supplied by the line count signals of the CRT controller 158 and the upper significant bits of address are provided by the two general purpose attribute outputs from the CRT controller 158. The line counter outputs (D01-D04) of the decoder prom 164 are connected to the character prom 166 and serve to access the corresponding line number of the character dot array residing in the character prom 166. As an example, if the character code lines (CC0-CC6) from the controller 158 to the character prom 166 correspond to the row and column number for a capital letter "T" then the individual dot lines which are displayed on the screen to portray the "T" are addressed via the line counter signals (LC0-LC3) to the character prom 166. It should be noted that the two general purpose attribute bits GPA0 and GPA1 are reset and the contents of the decoder prom 164 and therefore the output of the character prom 166 correspond to the line counter input to the decoder prom 164. This procedure results in a single height character being displayed on the screen of the CRT 178. When the general purpose attribute bit 1 (GPA0) is set, the output of the decoder prom 164 is such that each character line within the character prom 166 is scanned twice for the character lines 0 through 5 while the line counter of the controller 158 steps through the lines 0 through 11. Consequently during one complete row of character display, only the first half of each selected character for that row will be scanned and presented on the CRT 178. When the next row is scanned the operating program sets the second general purpose attribute bit (GPA1) and GPA0 is reset thereby selecting the next scanning portion of the decoder prom 164. Note that during the addressing of the second row the line counter communicates to the decoder prom 164 to select row numbers 6 through 11 of the character prom 166. Again as with the previous row, each line of the character code is scanned twice thereby doubling the vertical size of the final character. At the end of the presentation of double height characters a field attribute code must be programmed so as to reset the general purpose attribute bits. If this is not done the lower half of the characters for the rest of the frame will be displayed on the screen with the upper half missing.

Figure 30:
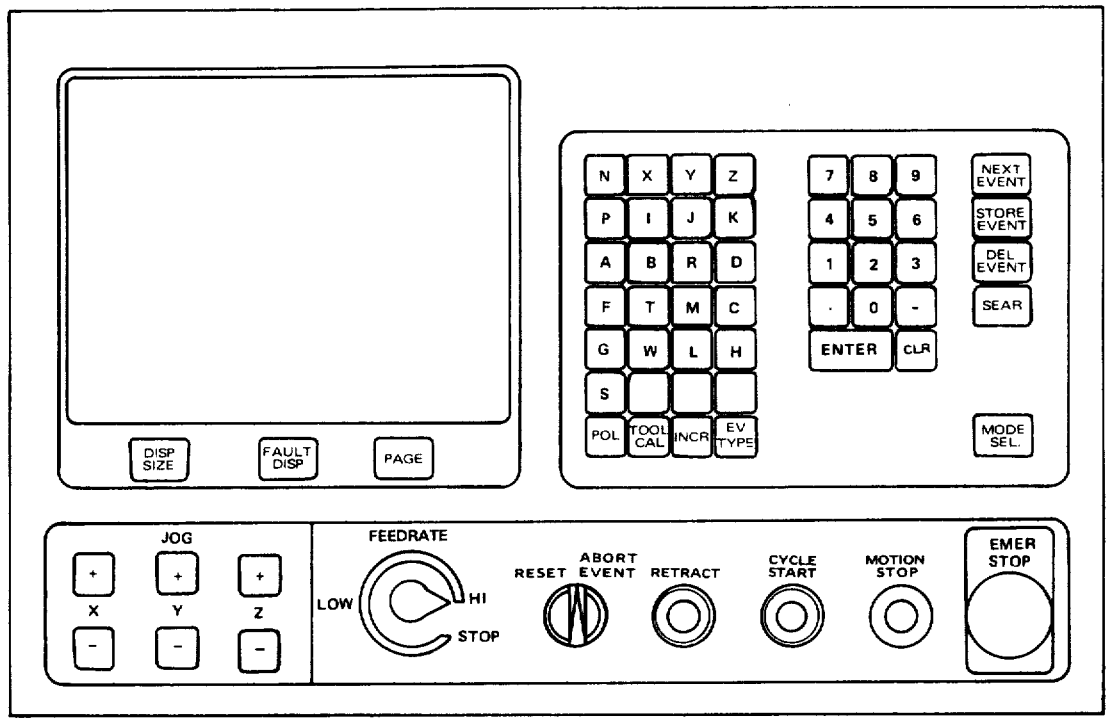
FIG. 30 illustrates a control panel.
Figure 29A:
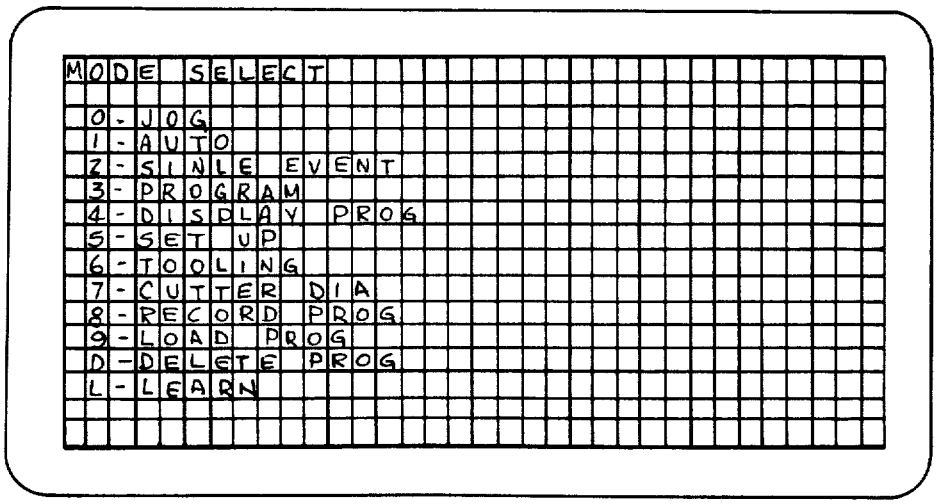
FIGS. 29A, B, and C graphically illustrate the system display format.

Reference is made to FIGS. 29 and 30 which illustrates a typical format for the information displayed to the operator and the panel 600 containing the CRT and keyboard or control panel. In response to the operators pushing of the mode control keyswitch on the control panel the system 50 generates on the left hand side of the screen a list of the various pre-programmed part programs. A particular mode of operation can be entered by pushing the number or alpha keyswitch whose symbol appears before the desired mode.

As an example if the operator desires to perform a JOG operation a zero is entered in the keyboard. This operator response causes the system to interactively display those parameters for the JOG mode as displayed in FIG. 29*a*. A particular JOG operation may be selected by pushing the numbered keyswitch whose symbol appears in front of the desired operation. The CRT 178 also displays the current position of the machine tool and the distance moved. By selecting various keyswitches the operator can communicate with the system 50 to cause the machine to be moved at various rates (keyswitches 5-8). By depressing 9, H or M various zeroing features can be selected.

As can be seen from the above illustration an operator need not be conversant with any computer language to communicate with the system.

FIG. 29*b* is illustrative of the format of the double sized characters which can be obtained by inserting the proper code or selecting a keyboard switch on the control panel.

Many changes and modification in the above-described embodiments of the invention can of course be carried out without departing from the scope thereof. Accordingly, that scope is intended to be limited only by the scope of the appended claims.

Having thus described the invention, what is claimed is:

1. A control system for controlling the motion of a machine tool along spatial axes, comprising:
   bus means, including system data, address and control buses for communicating data, address and control information to the below specified components of the system;
   operating systems means for storing program instructions, containing prespecified part programs that require data, manually input thereto for commanding particular machine tool functions and movements;
   interactive data means communicating with said operating systems means, for informing an operator of said system of the data required to perform a particular machine tool function or movement as needed by said part program and for permitting the operator to enter said required data;
   central processor means comprising processor means communicating with said operating systems means, and said interactive means for generating digital command signals to cause the machine tool to move, and for generating information be be displayed to the operator via said interactive data means, said processor means further including means for generating 16 bits of data and address information and means for multiplexing the data and the address information on an internal bus; said central processor further including
   address transfer means, including latch means, communicating with said internal bus and said system address bus, for temporarily storing bits of address information and including buffer means for communicating the address information to said systems address bus;
   data transfer means including byte swap means communicating with said internal bus and buffer means communicating with said byte swap means for transferring data to said system data bus, wherein said byte swap means contains first means for selectively transferring the low order eight (8) bits of data information generated by said processor means to the low order bit locations of said system data bus, and for transferring the high order (8) bits of data information generated by said processor means to the low order bit locations of said system data bus;
   control bus means, responsive to output signals from said processor means for indicating when said processor means has placed address or data information on the internal bus and for communicating the status of said processor means to said system control bus;
   memory means, communicating with said address and said internal bus for storing part program and variable data;
   system clock means for generating system timing signals.

2. The system as defined in claim 1 wherein said interactive data means includes:
   a keyboard means for receiving operator input data,
   display means including a cathode ray tube; for displaying system generated and operator input information to the operator;
   direct memory access (DMA) means, communicating with said system buses, for transferring display character information between said memory means and peripheral units such as said keyboard means and said display means and for generating control signals to inhibit the operation of said processor means;
   display controller means for requesting and for receiving character data from said DMA means and for generating line control command and timing signals including horizontal and vertical sync signals, to cause a dot matrix of characters to be written upon the face of said display means;
   delay means for delaying the vertical and horizontal sync signals;
   second memory means responsive to control signals from said display controller means for storing a predetermined dot matrix of characters to be generated on said display means and for providing a parallel data signal output;
   decoder means, responsive to the line command control signals from said display controller means for causing said second memory means to output a particular line of dot characters of said dot matrix and further including line control means for causing said second memory means to, upon selective activation, cause said second memory means to again output, immediately thereafter, said particular line of dot characters of said dot matrix;

shift register means connected to said second memory means for generating a serial data signal comprising information regarding a particular character line of the dot matrix;

display clocking means for causing said second memory means to transfer a particular character line of dot matrix information to said shift register means;

logic means for gating the output of said shift register means and the vertical sync signal; and combining means, communicating with said display means for combining the output of said logic means and the horizontal sync signal to generate a composite video signal.

3. The system as defined in claim 2 wherein said processor means includes command means for generating digital numbers indicative of the velocity at which the machine tool is to move along predetermines axes, the system further including:

servo means, communicating with the systems buses, for transducing said digital number with a corresponding analog voltage;

drive means attached to the machine tool for moving said machine tool in correspondence with said analog voltage;

transducer means communicating with said processor means, and responsive to the motion of said machine tool for generating a feedback motion signal, said transducer means including:

encoder means attached to and movable with said machine tool for generating a plurality of signals indicative of the position of said machine tool along each of said axes;

signal conditioning means responsive to the output signals of said encoder means for generating a plurality of square wave signals;

synchronizing means, including a flip-flop, one associated with each of said encoder means, for synchronizing the signals of said encoder means with said system clock means;

third memory means including a prom, for decoding the output signals of said encoder means and for producing motion pulses indicative of the motion of the machine tool;

counter means, one associated with each of said axes, for accumulating said motion pulses according to the polarity of said motion pulses and for generating a direction pulse indicative of the direction of movement of the machine tool about a particular axis;

data latch means for simultaneously storing said motion and direction signals and for transferring said stored signals to said processor means in response to processor signals.

4. The system defined in claim 3 wherein said counter means contains absolute position information whereby said counter means is not reset upon receipt of each successive processor signal.

5. The system as defined in claims 3 or 4 wherein said system further includes a plurality of d.c. status signals indicative of the status of various parameters of said machine tool; and buffer circuit means, one associated with each of said status signals for buffering each of said status signals;

first decoder means responsive to address information transmitted from said processor means for decoding the buffered signals;

first interface means for communicating each of the buffered status signals with said system data bus in response to signals from said decoder means.

6. The system as defined in claim 5 wherein said buffer circuit means includes means for conserving electrical power and for deactivating particular circuits therein during periods when particular status signals are not present.

7. The system as defined in claim 6 where said buffer circuit means includes:

a NAND gate responsive to an enable signal generated in response to a system control signal from said processor means, and further receiving at another input terminal a constant voltage;

optical isolator means for generating a logical signal in response to said enable signal;

driver means, including a darlington pair driver for buffering said logical signal, and connected to a second optical isolator means;

a first resistor adapted to receive at a first terminal one of said status signals;

a diode having its anode connected to said first terminal of said first resistor and having its cathode grounded;

second optical isolator means for buffering said one of said status signals, and for generating at its output an isolated signal; including an LED having its cathode connected to the anode of said diode, and wherein the anode of said LED is connected to the output of said driver means, said second optical isolator means further including a photo-transistor having its emitter terminal grounded and its collector terminal connected to a constant voltage;

filter means connected to the output of said second optical isolator means; and pulse generator means, including a Schmitt trigger, connected to said interface means for generating a pulsed signal indicative of the presence of said one status signal.

8. The system as defined in claim 6 further including:

output signal generator means for generating a plurality of constant potential status command signals comprising:

command driver means, connected to the machine tool, including a plurality of driver circuits, for selectively generating said plurality of status command signals;

second interface means, responsive to data from said processer means for transmitting said data from said system data bus to each of said driver circuits;

second address decoder means responsive to address information communicated from said processor means for decoding said data to selectively enable particular ones of said driver circuits; and driver circuit disable means for conserving power and for deactivating individual ones of said driver circuits when data for said individual one of said driver circuits is not present.

9. The system as defined in claim 8 wherein each driver circuit includes:

positive OR gate means for generating a logical signal in response to an activation signal generated by said second interface means, wherein the activation signal specifies a particular driver circuit, and an inverted control signal, wherein the inverted control signal must be high for said driver circuit to generate an output signal;

third optical isolator means, connected to the output of said positive OR gate means for generating a buffered signal;

amplifier means, receiving the output of said third optical isolator means for generating an amplified signal;

short circuit protection means having an output terminal receiving said amplified signal and adapted to be connected, at its output terminal to said machine tool, for protecting said driver circui circuitry during intervals when said output terminal is grounded.

10. A microprocessor process control system comprising:

bus means, including system data, address and control buses for communicating data, address and control information to the below specified components of the system;

operating systems means for storing program instructions;

interactive data means for communicating input and output data to said system;

central processor means comprising processor means communicating with said operating systems means, and said interactive means for generating digital command signals and for displaying process and character information to said interactive data means, said processor means further including means for generating a predetermined number of bits of data and address information and means for multiplexing the data and the address information on an internal bus; said central processor further including address transfer means, including latch means, communicating with said internal bus and said system address bus, for temporarily storing the address information and including buffer means for communicating the address information to said systems address bus;

data transfer means including byte swap means communicating with said internal bus and buffer means communicating with said byte swap means for transferring data to said system data bus, wherein said byte swap means contains first means for selectively transferring half of said predetermined number of bits of data information, corresponding to the low order bits, generated by said processor means to the low order bit locations of said system data bus, and for transferring half of said predetermined number of bits of data information corresponding to the high order bits generated by said processor means to the low order bit locations of said system data bus;

control bus means, responsive to status signals from said processor means for indicating when said processor means has placed address or data information on the internal bus and for communicating the status of said processor means to said system control bus;

memory means, communicating with said address and said internal bus for constant and process indicative data.

11. The system as defined in claim 1 wherein said interactive data means includes:

a keyboard means for receiving input data, display means including a cathode ray tube; for displaying system generated information;

direct memory access (DMA) means, communicating with said system buses, for transfering display character information between said memory means and peripheral units such as said keyboard means and said display means and for generating control signals to inhibit the operation of said processor means;

display controller means for requesting and for receiving character data from said DMA means and for generating line control command and timing signals including horizontal and vertical sync signals, to cause a dot matrix of characters to be written upon the face of said display means;

delay means for delaying the vertical and horizontal sync signals;

second memory means responsive to control signals from said display controller means for storing a dot matrix of characters to be generated on said display means and for providing a parallel data output;

decoder means, responsive to the line command control signals from said display controller means for causing said second memory means to output a particular line of dot characters of said dot matrix and further including line control means for causing said second memory means, to upon selective activation, to cause said second memory means to again output, immediately thereafter, said particular line of dot characters of said dot matrix;

shift register means connected to said second memory means for generating a serial data signal comprising information regarding a particular character line of the dot matrix;

display clocking means for causing said second memory means to transfer a particular character line of dot matrix information to said shift register means;

logic means for gating the output of said shift register means and the vertical sync signal;

combining means, communicating with said display for combining the output of said logic means and the horizontal sync signal to generate a composite video signal.

* * * * *